(12) United States Patent
Nicolades

(10) Patent No.: US 10,850,199 B2
(45) Date of Patent: Dec. 1, 2020

(54) SCRIPTING ENGINE AND IMPLEMENTATIONS

(71) Applicant: UberGeekGames LLC, Sandpoint, ID (US)

(72) Inventor: Ian Nicolades, Sandpoint, ID (US)

(73) Assignee: UBERGEEKGAMES LLC, Sandpoint, ID (US)

( * ) Notice: Subject to any disclaimer, the term of this patent is extended or adjusted under 35 U.S.C. 154(b) by 70 days.

(21) Appl. No.: 16/375,719

(22) Filed: Apr. 4, 2019

(65) Prior Publication Data

US 2019/0308104 A1 Oct. 10, 2019

Related U.S. Application Data

(60) Provisional application No. 62/652,720, filed on Apr. 4, 2018.

(51) Int. Cl.
*A63F 13/60* (2014.01)
*A63F 13/335* (2014.01)

(52) U.S. Cl.
CPC ............ *A63F 13/60* (2014.09); *A63F 13/335* (2014.09); *A63F 2300/6009* (2013.01); *A63F 2300/6638* (2013.01)

(58) Field of Classification Search
CPC .... A63F 13/60; A63F 13/335; A63F 13/6638; A63F 13/6009; A63F 13/358; A63F 13/822; A63F 13/35
See application file for complete search history.

(56) References Cited

U.S. PATENT DOCUMENTS

| | | | |
|---|---|---|---|
| 7,656,401 B2* | 2/2010 | D'Amora | G06T 17/00 345/419 |
| 2014/0258970 A1 | 9/2014 | Brown et al. | |
| 2016/0077811 A1 | 3/2016 | Kodosky et al. | |
| 2017/0052878 A1 | 2/2017 | Assenmacher | |
| 2017/0136355 A1* | 5/2017 | Rajapakse | A63F 13/30 |

* cited by examiner

*Primary Examiner* — Jasson H Yoo
(74) *Attorney, Agent, or Firm* — Leason Ellis LLP

(57) ABSTRACT

A multi-user interactive virtual simulation is provided to a plurality of devices in a first state as a function of an input layer, a rendering layer, a simulation layer, and a scripting layer. The multi-user interactive virtual simulation is provided to each of the plurality of computing devices over at least one respective network. Further, at least one value associated with an object associated with the simulation is received. The at least one computing device converts the received at least one value to at least one fixed point value. Moreover, the at least one computing device provides to the plurality of computing devices the multi-user interactive virtual simulation in a synchronized second state as a function of the converted at least one value. Further, the multi-user interactive virtual simulation is provided to the plurality of computing devices in the second state identically and substantially simultaneously.

20 Claims, 8 Drawing Sheets

```
 0. #blahblahblah
 1. paddle1 =
 2. {
 3.     score = 0
 4.     pos =
 5.     {
 6.         X = 0.1,
 7.         Y = 0.5,
 8.         Width = 0.025,
 9.         Height = 0.1
10.     },
11. };
12. #foo = bar! this is a comment!
13. paddle2 =
14. {
15.     score = 0,
16.     pos =
17.     {
18.         X = 0.9f,
19.         Y = 0.5,
20.         Width = 0.025,
21.         Height = 0.1
22.     }
23. };
24. /# hello, this is a multiline comment
25. dooldstuff ()
26. foo = bar
27. hihihi
``` objects: 555

FIG. 3

```
130.
131.    if paddle2.pos.Y < ball.pos.Y
132.        paddle2.pos.Y = paddle2.pos.Y + 0.015
133.    end if
134.    if paddle2.pos.Y > ball.pos.Y
135.        paddle2.pos.Y = paddle2.pos.Y - 0.015
136.    end if
137.
138.    if paddle1.pos.Y < 0
139.        paddle1.pos.Y = 0.0
140.    end if
141.    if paddle1.pos.Y + paddle1.pos.Height > 1
142.        paddle1.pos.Y = 1.0 -
            Paddle.1.pos.Height
143.    end if
144.
145.
146.
147.end
148.
149.draw = function ()
150.
151.    DrawRect (paddle1.pos.X, paddle1.pos.Y,
            0.025, 0.1)
152.    DrawRect (paddle2.pos.X, paddle2.pos.Y,
            0.025, 0.1)
153.end function
154.
                                    Objects: 553
```

FIG. 4

```
0. #this is a comment
1. paddle1 =
2. {
3.     score = 0
4.     pos =
5.     {
6.         X = 0.1,
7.         Y = 0.5,
8.         Width = 0.025,
9.         Height = 0.1,
10.        tmp = { 1 }
11.    }.
12. }.
13. # omment = this + more codey looking
        comments
14. paddle2 =
15. {
16.     score = 0
17.     pos =
18.     {
19.         X = 0.9f,
20.         Y = 0.5,
21.         Width = 0.025,
22.         Height = 0.1
23.     }
24. };
25. /# hello, this is a multiline comment
26. totallylegitfunction()
``` objects: 553

```
0. Interactive scripting. Type statements here!
1. >
```

```
0. script load time: 4516ms
   allocated memory: 42
   execution passed: False
``` objects 117

```
Enabled, true
0 Text {44}
SetViewport, function
OpenFile, function
Update, function
DrawCharacterCount, function
Draw, function
```

FIG. 7

SCRIPTING ENGINE AND IMPLEMENTATIONS

CROSS-REFERENCE TO RELATED PATENT APPLICATIONS

This application is based on and claims priority to U.S. Provisional Patent Application 62/652,720, filed Apr. 4, 2018, the entire contents of which is incorporated by reference herein as if expressly set forth in its respective entirety herein.

FIELD OF THE INVENTION

The present application relates, generally, to computer program products, program integration, and computer program development and, more specifically, to implementing computer program products and development via a script engine.

BACKGROUND

Interactive virtual simulations, particularly for multiple simultaneous users, continue to be immensely popular and sought after in many contexts. One notable use of such simulations regard multiplayer online real-time strategy games. Unfortunately, shortcomings continue to exist in such environments. For example, keeping all client devices synchronized continues to elude developers and players, particularly in view of varying hardware specifications of different devices, varying software configurations of such devices, and varying available bandwidth for such devices. These and other variables can result in hesitation and delay that causes the devices to be out of sync at any given time, such as during gameplay.

It is respect with these and other considerations that the present application is provided.

SUMMARY

In one or more implementations, a system and method are provided for multi-user interactive virtual simulations for respective pluralities of devices substantially in real-time. At least one computing device provides to a plurality of computing devices a multi-user interactive virtual simulation in a first state as a function of an input layer, a rendering layer, a simulation layer, and a scripting layer. The multi-user interactive virtual simulation is provided to each of the plurality of computing devices over at least one respective network. Further, at least one computing device receives over the at least one respective network at least one value associated with an object associated with the simulation. The at least one computing device converts the received at least one value to at least one fixed point value. Moreover, the at least one computing device provides to the plurality of computing devices the multi-user interactive virtual simulation in a synchronized second state as a function of the converted at least one value. Further, the multi-user interactive virtual simulation is provided to the plurality of computing devices in the second state identically and substantially simultaneously.

These and other aspects, features, and advantages can be appreciated from the accompanying description of certain embodiments of the invention and the accompanying drawing figures and claims.

BRIEF DESCRIPTION OF THE DRAWINGS

Various features, aspects and advantages of the invention can be appreciated from the following detailed description and the accompanying drawing figures, in which:

FIG. 3 illustrates an example integrated development environment ("IDE") that contains modern text editor functionality, in accordance with an example implementation;

FIG. 4 illustrates an example display screen representing debugging capability in accordance with an example implementation of the present application;

FIG. 7 shows a script integrated development environment in the context of a running script, in accordance with an example implementation.

DETAILED DESCRIPTION OF THE EMBODIMENTS

Figure 1:
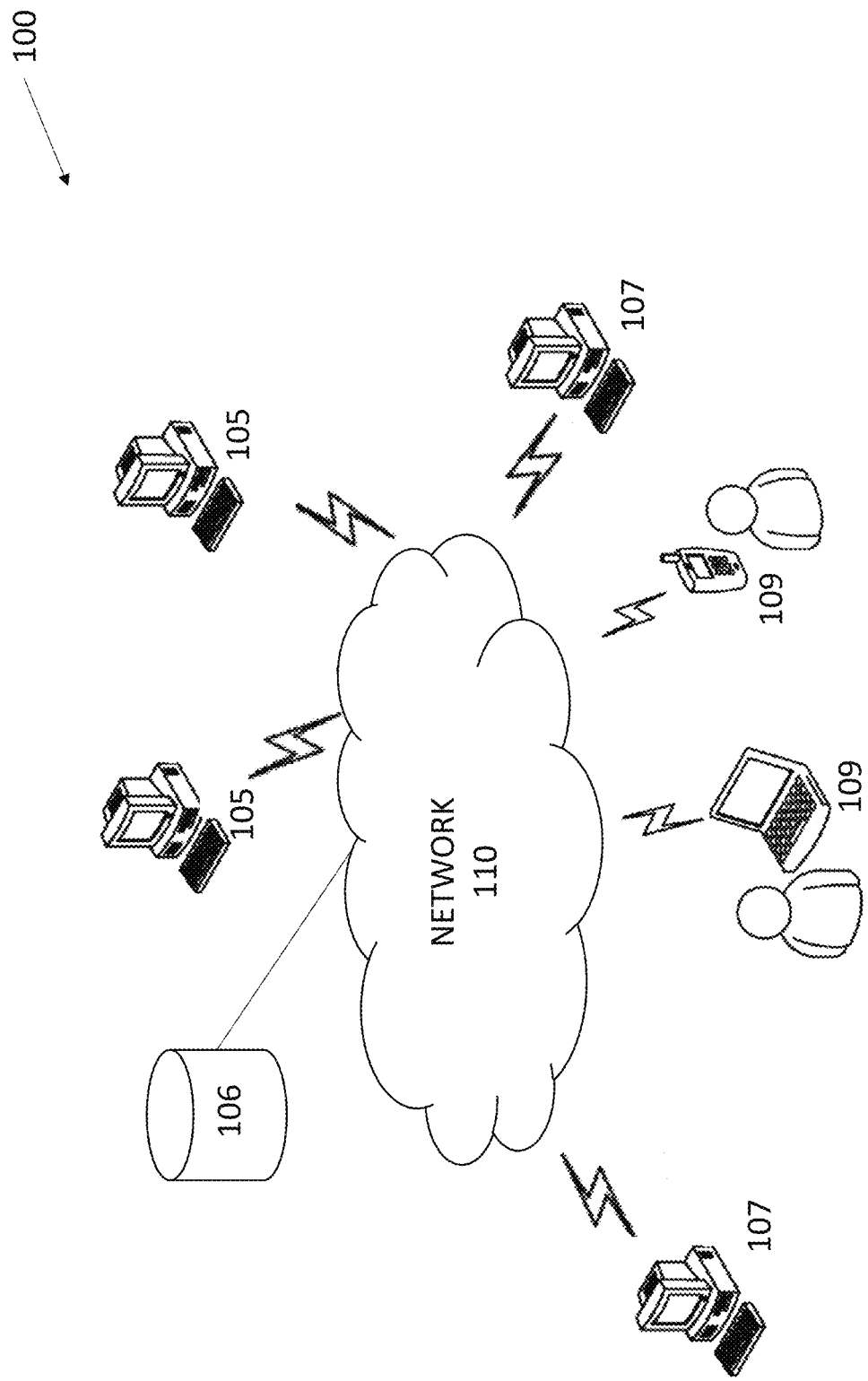
FIG. 1 is a block diagram illustrating a hardware arrangement in connection with an example implementation of the present application.

By way of overview and introduction, the present application generally relates to systems, methods, and computer program products, including in connection with development thereof. In one or more implementations, the present application provides multi-user interactive virtual simulations that execute across a plurality of devices substantially in real-time. As used herein, the term, "simulation" refers, generally, to any computer model that includes one or more objects with properties which vary over time based upon defined rules and/or client input. Some of the objects and/or properties may be run in lockstep on multiple clients simultaneously, in which the simulation state is not explicitly shared to synchronize every tick as in many traditional multi-client environments. This process generally is provided as a function of determinism in order to ensure that the instructions for the creation and maintenance of the constructed simulation are identical across all clients and executed at the same time for the duration of the simulation. This can be done by only sharing and synchronizing client inputs. An artificial delay may be introduced in order to ensure that instructions are executed at the same simulation time on each client at an agreed-upon time in the future, thus providing a buffer for the synchronization of instructions in order to facilitate the appearance of smooth, uninterrupted execution and interaction on each client, even over potentially poor network conditions.

A lockstep deterministic simulation, for example, includes one or more of these features in varying quantities depending upon a respective application. Some applications may even include traditional data sharing and synchronization where applicable, such as extreme real-time applications where fast dissemination of client input is required for certain objects. In such cases, however, a lockstep deterministic simulation may be retrieved for other objects which may not have as stringent of latency requirements.

The present application implements simulations as a function of a scripting engine that supports and/or manages program development and execution, in addition to providing simulation and rendering efficiently across networked communications. Such simulations include, but are not limited to, providing a multi-user interactive gaming environment that is customizable by users including during execution. Simulations may be used for a wide variety of purposes, from representing a multiplayer game, to a shared world, or even sets of data in distributed mathematical problem-solving applications; as general techniques, the underlying concepts may be applied and combined in innumerable manners.

In one or more implementations, a program development user interface is provided, and code developed therefrom is compatible with a plurality of computing operating environments (e.g., cross platform). The scripting engine of the present application is designed "from the ground up" and fully supports multi-user implementations, and in a manner that is both far more tolerant of suboptimal network environments with high latency, while requiring far less bandwidth than traditional networking technologies.

The present application provides a simulation layer that functions independently of other "higher" programming and operational layers. One skilled in the art will recognize that computing devices, such as servers, can run a simulation layer apart from a rendering layer or user interface layer. As noted and described in greater detail herein, the scripting engine of the present application supports determinism and is implemented upon integer-based mathematics for simulation variables. In implementations of the present application involving gaming, such as real-time strategy gaming environments, each client simulates a game state locally, and user input (as opposed to object states) is transmitted, maintained and synchronized over a network.

Run-time interpretation of scripts, in accordance with implementations of the scripting engine of the present application, efficiently enables users to modify simulations or executions of computer programming code as well as to generate content. This can be done in real time without needing access to the game's source, further simulation can be modified without needing to rebuild/recompile/reload a simulation, such as a multiplayer game, and functions across all platforms. Units within simulations, for example, contain program logic that is encapsulated within scripts. This architecture reduces the scripting engine's resource demands, as the engine can operate to handle low-level functions, such as pathfinding and collision detection in a gameplay environment.

In an example implementation involving a gaming platform and environment, a player (e.g., a character) can be represented at a certain location, such as on a planet. The present application improves upon a single coordinate space of three values (e.g., representing X, Y and Z coordinates in the space), and can support three separate coordinate spaces, each of which handle the coordinate systems in a different way and tailored for a different task. For example, a fixed-point simulation ("SIM") space is deterministic, which drives at least one other coordinate space, and can be considered the highest of level of detail coordinate space. The SIM space can be a large data structure containing all the information to place an object or character onto a planet, down to an extremely small level of detail, including ten attometers.

Continuing with an example gaming platform implementation of the present application regarding outer space and planetary gaming, a main data structure can be called a planet position, which as two 64-bit unsigned integers to represent the X/Y coordinates across the planet face. This contains a byte value representing an index of the planet face, and a plurality of faces (e.g., 6 faces) is provided for each planet, effectively creating a cube. Each planet is represented as a cube, and can have six height maps that are projected to a sphere using a cube to sphere mathematical projection. In one or more implementations planet coordinates contain two unsigned 64-bit integers to denote a local position, for a grid registration on the planet, and contain a byte representing a respective planet face and respective planet positions, such as for an object that is to be positioned on the planet. In one or more implementations, a grid of what can be considered sectors, referred herein generally as grid registrations, and each location at a higher level refers to one of the sectors, with two coordinates within a sector refers to a local position. This architecture supports extremely high and precise levels of detail. Additional pairs of 64-bit coordinates can be supported, as well, which provide increasingly precise and detailed levels of view.

Moreover, the present application can provide an arbitrary and effectively unlimited level of detail in fixed-point sim space. Most coordinate systems in other game engines have limited precision. The present application improves upon known engines by adding layers of detail by referring to grids within a single grid and, potentially, to grids therein.

The present application provides improvements over gaming and other simulation environments that use non-deterministic single-precision and/or double-precision floating-point space. Engine coordinate values from fixed coordinate simulation space are deterministic, which improves the ability for client devices to make calculations. For example, an object's location information is transmitted to a client device and used to render something that is converted to a double-precision floating-point world space coordinate. Calculations and determinations, such as regarding a respective client's camera view ability to display a respective location, are simplified and performed more quickly by restricting calculations to just those that are required. After being transformed to a local coordinate space, values are transferred to a graphics processing unit ("GPU") for rendering. This overcomes a known shortcoming by taking a double precision floating point value from a client, such as in response to a user clicking on something displayed on a planet, which is not inherently deterministic. When two clients respectively click on the exact same location from their perspective, even if their "cameras" are in the same location, the values would be slightly different due the inherent imprecision of floating point values, which would result in inaccuracy or programmatic errors. To avoid such error, additional rules and limitations can be performed by the engine to convert the values to be deterministic, provided the differences between the values are sufficiently de minimis to be handled. Moreover, a client device using a non-deterministic value for, for example, a unit movement command may not result in error at the client because the command is particular to the respective client. The engine of the present application can convert commands into fixed-point space that is deterministic across all other clients and platforms. For such movements, the layer of abstraction is changed at which the engine requires values to be deterministic. In this example, the engine can handle each client producing slightly different output because the output that is eventually used is deterministic. The engine can be configured to take one location from the client and provide a deterministic value that is close enough to be used for deterministic coordinates, and thereafter sent to the other clients.

For example, assume three users are selecting the same point in space, simultaneously: Each is resolved down to a fixed-point number, which is the nature of lock step deterministic simulation. A principal synchronizing or, in some implementations, the only synchronizing, that occurs is for the commands that bear issues to their units, such as movement orders. In the present examiner, assume a similar movement order is made. Each client executes the order formatted as a double precision floating point value of a place where a respective user is clicking on the terrain is resolved to a fixed-point sim space coordinate. That fixed-point coordinate is sent with a package of data with the movement orders.

Current graphic processing units ("GPUs") are not configured for double precision floating point values. Instead, most are optimized using single point precision values. If just double precision floating point values are cast, disruption would be caused due to lost precision, such as camera or object shaking as a result of being between rendering frames and the position, due to minor variations, lead to artifacts and poor performance. The present application employs a single precision camera space, which uses a camera that is floating with double precision floating point values, as the camera moves about, and every object that is to be rendered by the camera similarly can have a double precision floating point value. In accordance with an example implementation of the present application, the two respective double precision floating point values (one associated with the camera's position and one associated with the object) are subtracted, which results in a smaller single precision value that is relative to the camera. In one or more implementations, a matrix transform is used to render the scene using the proper coordinate spaces. More particularly and in one or more implementations, the precision of a single precision floating point value is localized to the location around the player's camera.

The present application includes a conversion process in which a code library is called to convert from X to Y—from sim space to world space—and double precision floating point world space values are converted from sim to camera space or vice-versa. This makes it relatively easy to convert from one coordinate space to another. Instead of being buried in "magic" functions that are not clear, a single library is used from which all commands are filtered through. This provides performance improvements by passing a transform matrix rather than recalculate for every calculation.

A benefit of C# and managed code in .NET is provided as processor directives; a large performance issue regards the calling of virtual functions (or "virtual methods"). An optimization technique of the present application reduces the overhead caused by performing the math described above, when possible. Another optimization regards the conversion of location information to cameral local world space. Instead of recalculating the camera matrix or calling a library method to access the camera matrix, the present application uses a static reference to a pre-created camera transform matrix and passes that to the code used for rendering purposes. For example, instead of calling matrix=library.convertocameraspace (X, A), there is a list of arguments (e.g., X, A) and at the end, a multiplier to the static reference to the matrix transform.

With further regard to planetary terrain, the present application provides sophisticated collision detection, response and physics, which are three separate but related concepts. First, how to determine whether two entities are colliding, and second the response to that, which is to resolve the penetrations so that they are no longer colliding. Next, which kind of physics to apply, such as Newtonian physics which take into consideration mass and elasticity or the like, and that have direct bearing such as when units bump into each other.

The present application implements a library of physics including new requirements and/or specifications. For example, and as described in greater detail herein, math functionality is fixed-point, so that it is deterministic while maintaining a high level of resolution, fidelity and responses, as it uses fixed-point numbers to represent floating point values in a deterministic manner. This ensures further seamless representations and performance, such as across planetary terrain, because it is hooked directly into respective coordinate systems. Also, algorithms for calculating collision points, detection, and responses, includes modifying coordinates so that they are all localized. For example, while entities that are being processed in a physics engine, calculations for objects that are near the entities are made and coordinates that are relative to objects are determined. In accordance with one or more implementations, when the physics engine of the present application attempts to determine if entity A and entity B are colliding, a distance check is performed between those two world space location values. In addition, there is an extra step before this in which entity B's location is subtracted from entity A's location to calculate a relative offset value in local space. This local space value is then used in all subsequent physics calculations, thus solving many issues related to lack of precision and spatial coordinate limitations. Using a grid system of the present application, such as for the planetary terrain, an entry that is positioned on a boundary line of a respective grid can still collide and interact with entities that are positioned on different grids. This is made possible by expanding the number of adjacent grids which are searched by each entity. Moreover, the translation to local, relative coordinates is a separate feature, which solves a separate problem associated with the potential imprecision and upper boundary issues inherent when comparing two very large numbers. Entities which are determined to be contained by one of those searched grids by the grid registration system are then marked for the local coordinate transform described above. A distance check is then performed to ensure that they have a chance of colliding (or, in the most simplistic case of a circle collider against a circle collider, used on its own) before collision detection proceeds, which is dependent upon the collider type. In one or more implementations, steps taken by the physics engine include (listed in a preferred order): clear all physics grids' entity registrations; register each physics entity with a grid at the end of that object's update tick; for every grid that contains at least one entity, build a list of potential colliding entities based upon size and adjacency. Further, the steps can include a check for duplicates if an entity is already in the potential collision list. For example, entity A confirms that entity B is within range for the next step. Entity B performs the same check. Thereafter, the pair entity A and entity B are indicated, such as in a lookup table, as scheduled to be looked at, and a duplicate entry will not be added. Further, the steps can include, for every pair of potential collisions, calculate relative offset coordinates and use the coordinates to perform a circle to circle distance check. Additionally, in the case of circle-tocircle colliders, the check has been performed and may early out. Otherwise if the distance check indicates that a collision is indeed possible, perform more intensive and accurate collision detection depending upon collision type, such as squares, polygons, or the like. Other steps can include performing 3D collision detection, either after the previous step or instead of the previous step. Results of these collisions can be then stored for each entity and available for consumption by respective simulation threads for the next tick cycle, such as for reduction of health, destruction of units, or the like. Moreover, the size of an entity is taken into account. For example, for a very large entity that encompasses multiple grids, the multiple grids are added to those grids that are searched for, to locate respective entities. This is contrary to how most physics systems operate, which house physical boundary areas. For example, fluid simulation defines cubical region in which a fluid simulation operates. In the present application, coordinates are relative and local, thereby enabling entities that are in different grids to collide and otherwise interact. This is conceptually similar to the camera local coordinate space, described herein.

The present application can employ three separate systems—collision detection, collision response and Newtonian physics. These are described in greater detail, below.

With regard to optimization, the present application inherently supports three-dimensional modeling and systems. For example, and in connection with simulations, three-dimensional virtual camera views can be rotated and units have a three-dimensional size and shape. Objects behave in accordance with their 3-D qualities. The present application provides an optimized 2-D physics and collision system for 3-D objects. This is tied into the fixed-point Newtonian collision detection/response system. The present application takes advantage by use of two-dimensional physics math for a largely majority of all calculations. Only in those cases that require 3D simulation, such as artillery shells raining down on an object, is a three-dimensional collision detection check performed. If 3D physics calculations were running constantly, the system would be less efficient and performance degradation would occur. The engine supports two-dimensional collision detection, resolution, and response for circles, squares, and arbitrary polygonal shapes. Further, a two-dimensional physics solution is important in the context of a 3D title, which is more efficient to perform the bulk of collision detection, resolution, and response in two dimensions rather than three. This solution also supports 3D collision detection as a, preferably, final step in the calculations to retain accurate detection for projectiles with parabolic arcs and targets with varying heights or shapes. For example, a complex, animated robot mech walking and being tested for collision against an artillery shell, which is first run through the two-dimensional physics engine and, should a collision be determined possible, is then marked to be run through a similarly designed 3D physics system in order to calculate the final result, allowing for vastly greater performance as the more expensive calculations are only run when necessary, as opposed to an implementation which simply runs all calculations in 3D to begin with.

In cases requiring, for example, 3D projectile and movement, a number of options can be employed. Regarding fixed-point simulation space, a height parameter at a predefined level of resolution can be defined. The present application can calculate as a function of height, 3D physics, and collision. For example, the fixed-point sim space of a unit's location is known, the unit's height is known (e.g., defined as a respective parameter), and a respective level of resolution can be determined. Using a height parameter attached to the respective objects, 3D physics and collision detection can be performed, such as for collision detection of projectiles against units. A fixed-point sim space of a unit's location knows the unit's height, and a three-dimensional collision object can be created, such as a cube or bounding sphere. Testing can then transpire, such as for impact. Furthermore, traditional 3D collision detection and response techniques can be applied in this final step, such as testing against animated meshes.

Another optimization provided in accordance with the present application regards artillery shells and other physical projectiles whose trajectories are affected by gravity. Full 3-D physics may not be needed to accurately simulate a parabolic arc of an artillery shell, for example, which would be a relatively simple calculation if only height is being solved. Accordingly, in accordance with one or more implementations a two-dimension Newtonian physics solver account for X and Y movement can be used, and a variable for parabolic arc for height is added. In combination, full and visually seamless 3D collision detection and response is provided in which a 3D arc and movement of a projectile in virtually any arbitrary location and direction are displayed. Internally, however, the system uses simpler and faster 2D and 1D mathematics, which is driven by the scripting engine of the present application, thereby allowing parameters to be tested in real time. To create an object that behaves a certain way, say an artillery shell that moves in a specific way and having a specific arc, information such as range of motion, minimum/maximum angles (e.g., for turret angle), height, and rotation angle can be submitted. Other information can be received, such as to define the type of object being launched, and a bounding sphere or circle or other object can be selected for the object, and variables can be defined, such as diameter of circle. Alternatively, a box can be selected and the user defines the size of each links within the sides—such as any size. More complex implementations can include any arbitrary polygonal shape for a bounding unit. From there, the engine is configured to determine that this is a projectile, and uses the angle to define the parabolic arc and perform calculations, and can determine collision detection against other objects. For example, a circle is used to define the object, which is converted to a bounding sphere, and the coordinates are tested to determine impact and results thereof.

In one or more implementations, noise functions are used to generate varied materials, such as varied planetary terrain. Varied layers of noise can be used to obtain varied terrain and other content to use. As used herein, a noise function refers to a mathematical function that is usable to produce natural appearing textures on computer generated surfaces. The development of Perlin Noise, for example, allows computer graphics artists to better represent complex looking natural phenomena in visual effects. Similarly, fractal like patterns can be used from noise function. In use, the function receives input and produces output, which is varied for the intended purpose, such as generation of terrain. Accordingly, the present application applies noise functions for generation of output using fixed-point mathematics, such as shown and described herein, and is inherently deterministic.

The present application operates to modify terrain in improved ways. In known terrain systems, for example, the terrain is generated once, and modifications to the terrain are very difficult to make. At run-time, various considerations are required for terrain changes. For example, how to regenerate "normal" maps so that light is portrayed well. Another example concerns collision boundaries for a physics engine so that players are not able to walk through terrain that has been eliminated. Additional complexities are found in the context of a multiplayer game in which any player has the ability to modify terrain. In such case, all of the client devices have to be synchronized. The present application supports such use via deterministic mathematics, and functions similarly (even identically) to a player command. More particularly, modification of terrain, for example, is resolved down to a simulation command of a client. For example, a client desires to raise terrain by five points in height in a specific simulated location. A command for doing so is executed over a lockstep deterministic network at some point in the future so that all clients in the respective session make the same change at the same time everywhere.

In another example, a client device is creating a new map for other players, and some terrain feature is being created, such as a canyon or a valley. The terrain is sculpted by the device, but often such implementation sculpts terrain features during runtime. For example, a factory is being built and the terrain is slightly sloped, resulting in a problem. The user may desire, therefore, to flatten the terrain (during runtime) for purposes of building the factory. In another example, something is used that causes a serious modification of terrain, such as a bomb that created a crater. In non-deterministic platforms, changes can be made locally and then synchronized to every client. In such case, the first client makes the change, that client's numbers are used for every other client which is bandwidth intensive and requiring a lot of data and overhead. Conversely, the present application allows each client to only need the original instruction which caused the terrain modification, such as the location, strength and other parameters of the bomb. Each client can then locally perform the terrain modifications calculated by those initial parameters in a deterministic manner, and apply them at the agreed upon simulation tick, resulting in a seamless modification of terrain with far lower overhead and latency than traditional implementations.

Moreover, in one or more implementations, recursive level of detailing is provided for backward and forward propagation of terrain modifications, including at arbitrary levels of detail. For example, some terrain is edited at a certain level of detail, and the level of detail chain above it is updated, and the level of detail chain below it is interpolated. This relates to the modification of terrain discussion, above, regarding a level of detail for rendering and displaying modified terrain values to the user. Internally, only one level of detail for any and all modifications of terrain is stored. This is the same as a game uses for all physics/math and functionality for providing the terrain. An individual player, however, may be playing in particular terrain from any respective level of detail. For example, the player may have zoomed out to the point where the entire area is one small vertex. Alternatively, the player may have zoomed in to the point where an area fills an entire display screen. In such case, one point of data may to be extrapolated many hundreds or thousands of times. In addition, creation of terrain, or changes to terrain, can be effected in accordance with the present application at various and arbitrary levels of detail. For example, generating a map can be done at more than one level of detail. A designer who desires to create a large land mass, such as a mountain that covers many miles of terrain or, alternatively, a designer who desires to make a small outcrop but at a zoom-level that displays much detail thereof, can do so as a function of back and forth propagation. The system can store the changes internally at a single level of detail, but as a user changes or manipulates terrain, the system can automatically generate level of detail chains up and down, depending upon the respective level of detail that the user is on. For example, a user viewing at a lower level of detail than what the engine is using, the engine can automatically fill in lower levels of detail below the information is recorded. Moreover, for levels of detail that are higher than the single level of detail the system is internally using, the system can automatically recursively smooth and generate those levels of detail so that when the user zooms out, the view is ready. If a user is sculpting terrain in a highly zoomed-in view, when zoomed in the points just collapse and less detail is displayed, although enough detail is displayed for the user to represent the sculpted landscape.

In known simulations, there is a single layered input. For example, a person clicks on something, which generates a command to be executed to affect the simulation. A different simulation identifies or detects the command and similarly executes the command to affect the simulation. In the present application, there are a plurality of separate layers. The first, for example, can be a user command (such as the click event). This is apart from simulation controls, such as selecting a plurality of units and providing an instruction or order for those units to move or otherwise act. This provides for improved optimization. For example, a movement command is limited to commands that are provided at the time meant for execution, and that depend upon data that is located in a different source. In the present application, work is performed at the time when a command is issued (not deterministic). After a command is received at any time (e.g., not deterministic), work can be performed (e.g., processes executed) that are in support of or otherwise associated with the respective command. For example, a move command is received from a player during a simulation, and the command relies on height information associated with terrain that is unknown to the player. A first processing "layer" identifies the information associated with the terrain in advance and, thereafter, when it is time to execute the simulation the information associated with the terrain is known and the simulation occurs smoothly.

In one or more implementations, circular queues, also referred to as a "revolver" data structure are implemented for lockless, non-blocking read/write of data across multiple concurrent threads. In a given context involving gameplay, the same game steps are simulated on all connected clients to ensure the same math, commands, and the like are provided and executed across all devices, to produce the same result on all clients.

The present application can implement multi-threaded processes, which is considered traditionally to be incompatible with a lockstep deterministic simulation. Lockstep deterministic simulation relies on the position that every instruction can be executed in the same order and in the same way for every client device. Anything that is not deterministic can corrupt that simulation state and create a desync. Multi-threading is inherently non-deterministic because every client device is not guaranteed to know when a respective command is to be executed. Execution occurs at different times at on different threads. Without a way to control code to ensure enforcement of the final results being in a particular order, the machines would operate independently and in different syncs, potentially resulting in each respective machine being out of sync with the others.

For example, a function determines whether a unit has been destroyed by a projectile. This function has to be called for every unit, for example, in a list of active units in the simulation. In a multi-threaded process, in which portions of the processing occur on respective threads, a unit may appear as destroyed, not destroyed, or partially destroyed on different device. This can lead to different results on different devices, such as depending on a particular order of execution. On one simulation, a first unit may be processed first, which can be significant depending on a particular context. For example, gameplay involving energy expenditure (e.g., by firing a laser) may result in one device showing all energy expended, while another device may show no energy expended. And any difference, no matter how slight, can result in a simulation desync, wherein each client can no longer be sure that their simulation is identical to every other client's. The effects of which are quickly compounded, e.g. by a unit surviving on one client but not another, which in turn causes an increased power draw, which in turn prevents another unit from being constructed at the same time as other clients think that it does, which in turn further affects a later engagement. Lockstep deterministic simulations are extremely sensitive, as any desync can result in a gameplay session that can only be considered broken.

The present application addresses and resolves issues such as described herein by using a multi-threading pattern that is roughly analogous to a producer/consumer field, wherein units can be updated although results of the updates are not committed until after the all associated units have been processed. These updates are then applied to units in the same order on each client to maintain determinism. In operation, on the simulation side a number of units are processed on multiple threads and the results of the processing are not cast until the processing is complete. In addition, guidelines can be met regarding the order in which memory is accessed and used on various threads. Simulation can regard more than just units, and can include updating path finding and collision detection, which can each run on independent threads and operate in accordance with particular rules, such as ordering of operations and processing to assure a single order of state change, regardless of the order in which threads process.

Although the network architecture is related and tied into the simulation architecture, it is a separate concept. In the networking model, delay is configurable. A delay can be introduced, such as a 500 millisecond delay, to ensure consistent simulation in real-time gameplay. This can be used, for example, to delay by the amount of time from receiving a command to executing the command, ensure consistency in the simulation and to be consistent in a lockstep deterministic simulation during multi-threaded processes and across a plurality of client devices. Further, a simulation can be paused during adverse network conditions, to ensure that all clients are caught up during a simulation. Further, an average delay can be calculated and enforced as a function of performance, or a "rolling average," can be used to delay simulations, such as to keep client devices within a number of simulation ticks or "sim ticks" (e.g., 3 sim ticks) and/or or other configurable parameters that can be based on the amount of network performance and other considerations. Selection of such parameters and values associated therewith can depend, for example, on respective tolerances in connection with frames that are supported and being provided to respective parties. If the game is taking place on a LAN, with extremely favorable networking conditions due to close physical proximity of the client's hardware, then a very low delay can be utilized to fully take advantage of the low latency environment. Conversely, if the game is taking place across the world with clients with relatively poor connections, then a higher latency can be utilized to facilitate the appearance of smooth gameplay, whereas traditional networking techniques, such as those which immediately transmit player positions each frame, would result in a very choppy and difficult to play experience. These rules may be further relaxed for clients which are simply observing the game and not directly participating in its play, as vastly greater latencies of multiple seconds are perfectly tolerable for passive viewers. In such a case, the simulation may be retransmitted from one or more other clients, with additional settings based upon the desired amount of information that is to be publicly shared with the observer and at what time. An example might be only allowing a player of the same faction to see that faction's units in a simulation, so that a competitive advantage could not be gained. In other situations, enforced, extremely high delays of multiple minutes may be desirous for competitive play, so that observers cannot share otherwise hidden information with one or more players who are playing the game in order to grant them a strategic advantage.

The architecture of the present application can operate well within networks and is usable with other simulation architectures that are not lockstep deterministic. The system is designed to support a large number of clients. The simulations are not overly "concerned" with identifying where data originate from. Client user commands are received, including from arbitrary data sources, which enable clients to simulate past activity seamlessly. This also provides the ability to join or resume games that are in progress, and other novel interactions such as multiple players taking control of a stored replay at a certain point in time. For example, a high level competitive match is played, and two players later watch its recording. One of the players wonders if, had the original player made a different tactical decision, the game may have had a different outcome. To test this theory, the replay is loaded in a special mode which gives control of the game at a specified point in time, disregarding the remaining commands and allowing the players to play an entirely new game from that starting point. This new game can be saved in the same way for future players to do the same if they wish.

With further regard to replay, it is generally considered that using lockstep deterministic simulation architecture results in a limitation such that the ability to scrub backwards through a replay is difficult, if not impossible. This is because replays are stored lists of commands that are later applied to the simulation. Once performed, replay cannot easily be undone. Thus, the simulation can be thought of as going in one direction only—and while advancing quickly through the replay ("fast forwarding") may be possible given enough CPU power, the inverse is not possible. This is to the requirement of undoing commands that the architecture is not designed to support. In other words, players have to constantly close the game and reload the replay if they missed something and want to go back and watch it again, which is often a frustrating, and annoying experience, particularly for a game that is longer than a few minutes.

The revolver queues of the present application and that are used for synchronizing rendering objects between threads resolves this shortcoming. As an entire state of the game to be rendered is stored in each slot, the state can be stored indefinitely, and be generally restricted only by limitations in available memory. Thus, for games with sufficiently low memory requirements and/or players with sufficiently large quantities of available RAM, this buffer can be trivially, storing more prior frames of the game in memory. Then, reversing through a replay becomes a simple matter of halting the progression of the sim, and going backwards through the queue.

This feature can be further enhanced by using those same frames to store a 'checkpoint' of the game's state in memory. Simply assigning one frame out every, say, 10 seconds or so, and committing it to longer-term storage in RAM, provides this enhancement. Thereafter, if a player runs out of RAM to reverse towards a point in time, the closest checkpoint can instead be resumed, and execution of replay commands is resumed from that point in time.

Accordingly, these two features taken together allow for functionality equivalent to being able to reverse through the entire replay to any arbitrary point in time, limited only by available RAM and CPU, both of which can be further mitigated via intelligently scaling the length of saved frames and the number of and length between number of saved checkpoints based upon available resources.

Moreover, the present application can employ dynamic peer-to-peer ("P2P")/server networking architecture, allowing for everything between serverless, pure P2P and server-authoritative and simulated sessions, or anything in-between. The present application improves on computing environments, including gaming platforms that have a single networking architecture. The simulation processes and architecture of the present application is very tolerant of various networking architectures, and by not requiring a source of information, networking technologies can be freely mixed or matched depending, for example, on most effective performance in the environment and/or class of features that are available, such as pertaining to a particular game mode.

Pure P2P synchronization of user commands or, alternatively, server-aided interdiction is supported in accordance with the teachings herein. In one or more implementations, each peer sends commands to a server computing device for redistribution to other peers, or only a subset of peers can utilize this so that the server can act as a middleman between peers with poor connections to each other, in the same simulation session as those who are communicating directly via P2P. In another, perhaps enhanced, implementation a client is designated as a server, which accepts and sends commands from the various clients. This is useful in cases in which two devices do not have a good connection to each other, but do have a good connection to a different device. The different device can be designated as a server, which accepts and sends commands from/to the other devices. Servers can oversee and facilitate connection between devices, and can receive/send commands to devices without processing any data on its own. In yet another alternative, one or more servers can simulate processes, as well. This alternative implementation is useful, such as in cases in which an assurance that client devices are executing the same version of software or other condition in which specific desired executions occur, such as for error checking among the clients. One method for error checking client devices includes hashing the value of objects in a simulation and comparing the hash value with other clients. If there is a de-synchronization, the error checking can be detecting and a cause therefor determined, such as to prevent recurrence. In one more implementations, hashes are checked at the launch of an application, such as at the beginning of a game, to prevent a situation from arising in which a time investment is made (such as in gameplay) that can eventually result in a de-synchronization and an unrecoverable error that results in termination of the application (e.g., the game).

Still further, a form of anti-hacking is supported, such as to preclude unauthorized changes to an application (e.g., by adding values or features). The present application detects when a user alters a patch, locally, as well in more complex instances such as when a user uses a third party tool to modify the memory of the application (e.g., a game) at runtime to find a piece of memory that identifies values (e.g., number of lives, ammunition, or the like). This would lead to a de-synchronization which would expose the hacking and identify the cause.

In addition, the present application provides functionality for merging of a simulation state, thereby allowing for new devices to join simulation sessions that are in progress. For example, two devices are currently in a simulation session and a third device enters the simulation. The simulation state is cached from one of the devices and transmitted to the new device. In order to ensure synchronization among the three devices, the simulation is paused while the third device "gates" in, the third device processes all of the units and other data in the simulation to bring that device current. Once the third device is at the same position and has all the same data at the same point in time during the simulation, the simulation resumes along all three devices with the addition of the third device.

It is envisioned that during a simulation a network disruption event can occur for a device and that is caused during a relatively brief period in time, such as in connection with network performance and lasts only for a few seconds. In such case, the simulation can be paused and simulation state can be cached and transmitted to the respective device. Once the device processes the information and regains its position in the simulation to be current, the simulation resumes for all connected device. In an alternative, the simulation does not pause for the devices that are not experiencing any anomaly and the respective device simply resumes the simulation at the current state after it catches up. In yet another alternative, the devices actively involved in the simulation can be notified that a de-synchronization event occurred and that the respective device is removed from the simulation session. In the example of gameplay, the respective device may lose its assets (e.g., units), such as if the units are destroyed.

In one or more implementations, artificial intelligence can be implemented in which, during a simulated environment a respective device experiences a temporary delay or interruption, the simulation can be maintained for that device. In such case, artificial intelligence effectively steps into the device's role and acts on behalf of the dropped device for a temporary period, such as 5 seconds. In such case, the active devices in the simulation can be notified that artificial intelligence is controlling one or more respective devices.

The present application further supports initial determination of each player and setting thresholds for gameplay. For example, a client device can simply be blocked and precluded from gameplay due to insufficient performance. Alternatively, device(s) can switch to a different networking environment (e.g., P2P), potentially leading to a different simulation that is available for a respective device. For example, an operator of a netbook on a slow internet connection could negatively affect the simulation for that operator's device, or possibly affect the simulation for a number of other devices. Performance of the simulation can be affected, for example, as a function of graphics board performance, available network bandwidth, features of the simulation or other technical parameters. Depending upon specific optimization in connection with each local device can affect performance during simulation.

In one or more implementations, the present application is configurable to adjust specific hardware/software parameters as a function of optimal settings and performance, such as to reduce graphic details, audio content or other content, substantially in real time and in response to detection/determination of client performance and events.

The present application further supports improved pathfinding. In one or more implementations, four separate pathfinding technologies are implemented, which can be modified to ensure determinism. Those include Modified A* for high-level quadrant traversal, Flowfields, Continuum crowds, and RVO2. When a pathfinding command is received, a determination is made as a function of the four separate pathfinding technologies, which technology is most suitable. Further, a determination is made to ensure that any changes to terrain are represented and mapped.

As known in the art, A* relates to a grid of open or closed sectors, for example, in connection with mapping of planetary terrain and open or closed quadrants. Calculations can be made for detecting whether it is possible to traverse from one quadrant to another, and which direction to traverse. For example, A* is the lowest level of granularity used by the pathfinding system, and is designed to quickly determine the most efficient way to path units towards their goal in broad strokes. First, each unique land mass that is above the planet's sea level is given a unique identification number. If a movement order is given for units which are not amphibious, and the unique identifier of the land which they are presently on differs from the destination's location, then the movement order is terminated early as there is no way for the units to reach their goal. Otherwise, the A* algorithm is performed in order to find the list of high-level grids that the unit travels along. Geographic topology is primarily utilized, as steep grades resulting in cliffs and valleys may block off certain types of units from traversing between that section. Furthermore, player-made structures, such as walls explicitly designed to restrict the travel of units, may result in impassible paths. Each grid that the A* algorithm walks contains information regarding whether or not each side of the grid is traversable from the other side—north to east/west/south, east to north/west/south, etc. This data is cached as the simulation progresses, with opened or closed paths being recorded as the events happen, so that it is not necessary to recalculate the state of each grid every time the A* engine is queried for a route. For example, a simulation presents a mountain pass contained within a particular area, in which north/south passage is available, but not east/west. As modifications of the terrain are made, the changes are added and passageway through respective quadrants can be represented.

It is recognized that flow fields are at a lower level of detail from A*. For each sector, once a valid A* path is calculated a flow field is generated for each of those individual factors that the units traverse along the route. Starting a given force and destination in a grid. A destination is started at a value of 0, and a counter is incremented for each additional sub-grid towards the destination until it fills an entire containment volume of an entire grid. To calculate a unit's path along the respective flowfield, a value representing a square a unit is on is sampled and the next "cheapest" location to the square that is adjacent to it is found. By calculating vectors in advance for every square, the respective vector can be found to traverse. This is also usable for identifying obstacles (e.g., buildings, walls, mountains, etc.) that need to be traversed. By calculating directional vectors in advance, a unit can easily query what direction it should be moving in from any position along its route, rather than needing to perform relatively expensive recalculations on every simulation tick. This also simplifies integration with other pathfinding technologies, as it can conceptualize pathfinding as a competition of weighted directions—the optimal route towards the destination, versus, for one example, the influence of a large group of units moving in the opposite direction along this unit's path, with the newfound optimal direction with those two influences taken into account then able to be found via trigonometric functions and/or other weighted parameters.

Continuum crowds represent a further lower level of detail, as units are traversing along a flowfield, a continuum crowd field is generated based upon a position and velocity of units that are in similar geographic locations, and are on the same field that can affect things. For example, during gameplay tanks pathfinding are not concerned about airplanes as there can be no collision with planes. Tanks are, however, concerned about other tanks as other tanks can be on the same field. The continuum crowd uses an algorithm that efficiently models crowd flow dynamics. For example, a number of units traveling in opposite directions that are passing each other, such as in a narrow terrain (e.g., a hallway), like sized units travel together, thereby effecting efficient movement along similar units to minimize blocking and interfering with each other.

RVO2 (Reciprocal Velocity Obstacle) framework is a collision avoidance resource that is usable for calculating vectors for precision pathways, in an effort to optimize collision avoidance for a plurality of units. Using just continuum crowds, for example, two of the same type of units can still collide. RVO2 is particularly useful to identify the likelihood of such collision and prevent it in time by redirecting one or more of the units. This can be done by identifying similar pathway vectors that can result in the same general or specific location where they are traversing.

In one or more implementations, the present application provides modifications to each of the four pathway technologies, including to improve traversing in deterministic environments. For example, in one or more of the technologies, processing was converted from multi-threading to a single-process environments. Furthermore, many implementations of Continuum Crowds rely upon GPU acceleration, which is inherently nondeterministic and incompatible with our architecture, and thus was re-implemented on the CPU where applicable. While such conversion appears contrary to features described herein that are directed to multi-threading environments, performance improvements are realized by converting to a serial-based system and processing them on respective threads. This is in part due to preventing interruptions caused by changes in terrain in connection with path finding.

Another modification provided in connection with the four pathfinding technologies regards conversion to fixed-point math. In some cases, simple search/replace functionality was implemented to make the modifications. In other cases, logic was modified to support comparable results for the logic, but in a way that is deterministic or otherwise better for performance.

Moreover, in one or more implementations of the present application, multiple units can share the same pathfinding data for the same destination, such as when ordering a large group of units with a single move order. For example, when a pathfinder receives a command to move units from point A to point B, the command is shared among all users as each unit has a reference to the instantiated pathfinding object. More particularly, processes associated with queueing and caching can be used to maintain performance. A pathfinding token representing a commitment for movement once the pathfinder process has an opportunity (e.g., has completed other tasks) and an interim instruction is issued for the units to move generally in a given direction. When the pathfinding rule is executed, specific movement instructions are received that are shared by the units, such as flowfields, continuum crowds and the like, and more detailed information for better pathway navigation. Unless an obstruction or other limitation is detected, which is handled by the first level of pathfinding (e.g., to instruct some of the units to travel in a particular path and other units to travel in another). Another distinction that results in like units being issued different pathway instructions is respective unit types. For example, during gameplay an airplane and a tank are issued different respective pathway instructions, even though both may be traversing to the same specific location. Yet another distinction regards geographic locations. For example, like units on different continents should not execute the same pathway instructions. This can be handled, for example, by factoring an inherent limit to the distance of units that are located from a respective location associated with a commander. Referred to, generally, as a command range of a commander, a circle can be defined, such as that is roughly equivalent to 80 square kilometers. Move commands that are issued can be processed within the range of command. In one or more implementations, land masses such as continents are assigned a value, such as a number. If an order is received from a land mass for movement within a different land mass, the process can react early on to reject the movement order and alert the user accordingly. Alternatively, the A* pathfinding technology accounts for obstacles or terrain modifications that would impede or prevent traversing a path (e.g., a valid path cannot be detected), and similarly can reject the movement order and alert the user accordingly.

In one or more implementations, localized formations can be added, such as to order units to file into a row at their destination, or attempt to move to their destination while retaining a box formation. For example, a user during gameplay right-mouse clicks and selects an option for issuing a move order. A graphical user interface can be provided to enable the user to rotate his/her mouse while holding down a selection and a "holographic" preview is generated and showing a destination or units and for alignment. When the mouse button is released, the move order is input and offsets for the formation is saved. Changes in formation can further be made during runtime. In such case, the units can automatically fall back to default pathfinding behavior if unable to comply, such as due to obstacles. Moreover, the present application supports awareness of changes while on route. For example, a set of walls is constructed between a group of units and their destination, a callback order can be triggered to enable the paths to be recalculated.

Turning now to implementations involving scripting, the present application provides a plurality of features associated that provide significant performance benefits and development functionality. In one or more implementations, the present application includes runtime generation of one or more syntax parsers, which is useful for describing a context-free grammar in connection with a programming language's syntax. EBNF is particularly useful for adding detail to respective scripting languages. For example, EBNF can be used to provide details regarding an entire character set in a particular implementation. Individual rules can be assigned for subsets within a character set, and complex rules can be created such as by identifying specific elements (e.g., keywords, identifiers, or other elements). The present application implements a reader of EBNF files, which constructs an interpreter of corresponding syntax during runtime. Any seemingly arbitrary EBNF grammar is interpreted and understood as a function of a parser. Differences between one parser and the grammar that it is built from (e.g., the control file that defines that, such as LUA) and a different language that may be similar in many respects but includes differences that alter how the language is parsed.

In an example of a shipping company that has business logic set forth in a first programming language, a second company wishes to interface with the shipping company, and the second company has different business logic in programming language B. The present application utilizes a scripting language to create a grammar definition of languages A and B, and code from both languages would be able to interpret, compile and run code from both languages. The EBNF control file contains a language blueprint to define the language specification. For example, keywords, syntax, identifiers and other information needed to compile a script and linking the script to code is handled by the EBNF parser. Specifically, a parser of the respective language is generated. This is effected, for example, by recursively iterating through the EBNF description and parse it into a custom parser that is designed to understand EBNF. This has support for built-in rules and functions of EBNF that enables creation of complex recursive rule sets, effectively providing set(s) of rules and filters that build upon each prior step. The parser creates a run-time representation of the rules and builds another parser that is directed by the EBNF. Other programming languages explicitly require recompilation for this step, as they generally rely upon lexers such as yacc or lexx which output their parsers in more host-language code, which must then be recompiled every time the grammar changes. Conversely, the only time that recompilation is necessary in our system is when host code is modified, such as to add support for fixed-point numbers in addition to f32s. This allows for a library of host code to be re-used across implementations of different EBNF-controlled scripting languages, as many underlying features of programming languages, such as variable definition, operational statement evaluation, behavior of basic data types such as integers and floating point numbers, etc. For example, the manner in which an integer variable is declared in C# and JAVA is effectively identical, with the primary difference being that of its syntax. Once the EBNF parser is created in memory, a linking stage is implemented, in which the identifiers created in the control file is linked to an instruction in the host language (generally, meaning, not in a scripting language of a script engine, in accordance with the present application. For example, statement commands that include function calls, assignment operations, or elements, can be treated as hooks enabling assignment of code written in a host language. For example, when a function is called, an integer that is a constant is encountered or virtually any programmatic event can be interpreted and code written in a host language can be run at that point. The present application provides significant power and flexibility for all arbitrary constructs that were created in the EBNF control file.

The present application precludes a need to form statements that conform with respective languages. The scripting engine re-implements layers of abstraction, as a function of the EBNF file that identifies and relays every type of identifier, statement, and keyword, and how it all functions.

In accordance with the functionality afforded by respective EBNF parser(s), the present application supports runtime language syntax switching and merging. For example, an EBNF file is created for a definition for a first language, such as C#, which allows for running, interpret, modify, or other steps for that first language. Additionally, an EBNF file for a second language, such as JAVA, can be loaded for providing similar functionality. The EBNF files running on the same underlying systems provides for a language agnostic approach and there is little or no need for identifying which language is effected (C# or JAVA, in this example), and languages can be mixed and matched where instructions are received and/or executed. This can occur at runtime, thereby providing significant flexibility.

Moreover, the present application provides for fully interpreted runtime execution, with full debugger support on all platforms, or supports instructions compiled to bytecode and executed. The architecture of the present application provides with memory inspection functionality, including for direct access to underlying memory structure from code written in a host language, practically devoid of such code host code and for script memory manipulation. In one or more implementations, debugging functionality to interactively step through code and take advantage of debugging features, such as break points, and see how the code is executing. The application can resolve, during runtime, errors from any arbitrary piece of code at a respective location of the source file from which it came. Since the debugging is written in script, it is usable across virtually any platform that the script engine itself runs on. In one or more implementations, a graphical user interface is supported that includes a console that supports writing and editing scripts. The console enables a user who is writing a new script to debug the script in the same interface console. Further, the scripting engine can interface with a third-party debugger, and to send/receive input/output from and to the third party debugger.

The present application supports tools, including an integrated development environment, memory analyzer, interpreter, which are written in script, and implicitly cross platform. A script that compiles and executes on a first platform, for example, can access and develop, analyze, interpret and execute code and program logic of a second platform. This overcomes a need to consider how to interface with code that has been written in a specific language for a specific purpose, such as to port into an intermediate format. The present application precludes a need to add technologists, requiring additional overhead, more people required to be on call, and other expenses. For example, one group may write in one language and another group writes in another language, and integrating their work can introduce new problems, such as using output from JAVA as input to LUA. Other complexities involve implementations, such as using web services, sockets, writing to a file, locking/unlocking rights, or other considerations that arise by disparate devices and environments that are not designed to work together. Even if working on the same machine, direct access to memory is not available, for example, for copying. Objects are represented in very different memory structures in different language environments, which can require a translations from somewhere.

The present application enables for users to write and/or implement code (including "off-the-shelf" code) for execution in respective languages, such as LUA and JAVA. This provides for a single system operating on a single platform to operate by and between a plurality of programming environments, thereby providing for casting data, exchanging variables, executing code, and to switch between seamlessly. This can include, for example, providing an ease for adding/modifying/replacing core memory types (int, float, bool, etc.), as well as providing fixed-point math support for determinism. In one or more implementations, memory types can be added, for example, by creating a subclass (e.g., of scriptengine.memory), and include identifying information to define and, thereafter, instantiate an object therefrom. For example, an EBNF file includes descriptions of data types, including rules to set value types or the like. More particularly, an EBNF file includes descriptions of variable types, such as 'int' or 'f32'. The linker is effectively the arbiter of which of those grammatically labels is important, such as resolving all grammatically matching statements of "intvalue" to an integer. This is then assigned to the relevant host code instruction for an integer, for example.

The present application can be configured to include a memory architecture that supports use of information stored memory that is used by the engine to be stored as object(s) and that can be serialized and saved, and then later restored in its then-current state.

In one or more implementations, such as regarding a gaming implementation, a specialized data type can be defined in script to hold a reference to an object of code written in a host language which, for example, can include preference information of a unit that a script is currently attached. Rather than recreate an entire memory structure of code written in a host language within a scripting engine, which would be slow and unnecessary, the specialized data type can avoid a need for multiple layers of abstraction that would otherwise be needed to be traversed in order to determine values of variables each time respective variables are called a new script data type can be created to contain a reference to the data type of code written in a host language. All of the ways object(s) in code written in a host language can be interacted with can occur in the scripting engine, such as to manipulate the object as a native data type, can be resolved down to that memory object that stores that host language type, e.g., as a pointer. This is usable for any field that is modifiable by the user, in script. For example, unit properties (e.g., health, maximum health, damage, weapons, etc.) are inherited as a function of pointers (e.g., pointers to the script memory entries) that are stored in the script engine's code for the respective unit and associated class. Thereafter, a respective pointer can be accessed and used. This is especially important for performance optimizations, as in most scripting engines, there is an unavoidable amount of overhead when accessing or modifying memory stored in the script engine, or otherwise passing data back and forth between the host and the script. Direct access to pointers/references allows this to be bypassed, and scripting performance equivalent to host code achieved in many important situations.

The present application supports script memory that is decoupled and sharable, which can copy/manipulate the memory of a script object and assign it to another quickly and independently (e.g., load a template for a unit, then upon instantiating a copy of it, simply perform a copy of the script's memory and assign it to the new unit's script so that the script's initialization does not need to be performed again). The new unit is configured with that memory in its initialized state, without a need to perform the steps that would otherwise be required to have that unit initialized accordingly. Any further custom initialization logic for the respective unit can be defined and run for the unit.

Decoupling and sharing script memory provides for improved performance. Memory in script is, generally, represented by lists of memory objects. It can be stored in a scope structure, such as a scope stack that starts at a zero level (e.g., a list or table), that incudes instantiated memory objects, each of which is referenced in the table. For example, a variable "A" references a memory object of the table. Thereafter, when another layer scope is added, for example a function or new table definition (or combination), a new scope is created and references to the objects therein similarly saved (including, for example a variable "A") and are not overwritten or do not overwrite same-named variables of higher level stacks. This can go on recursively for virtually any number of stacks. Memory is effectively recursive stacks of scope, which enables memory from one script to be assigned to another script. Moreover, memory from a script can be saved and later restored, or receive/replace memory later in time.

The present application supports continuous garbage collection, which can be built into the memory system and enabled/disabled at will, such as by a simple flag, in case a host language has effective garbage collection functionality and/or in operation. Garbage collection in accordance with the present application takes advantage of reference counting, in which a memory object is monitored and other memory objects that have a reference to the memory object is counted. When a variable is instantiated, there is one reference to the variable. Later, if the variable falls out of scope and is returned from function, for example, reference counters associated with other variables that are within its scope are decremented, and any reference that is below or equal to zero, then it needs to be collected, which is performed. In addition or in the alternative, a pool architecture is employed, to preclude directly initializing, instantiating, and destroying objects, particularly in environments in which host language environments employ their own garbage collection processes. In one or more implementation, when the script engine is launched, processes in the script engine responsible for managing memory types automatically execute.

The present application further includes functionality that supports deterministic software threads (referred to herein, also, generally as "green threads", "tasklets"). Sets of instructions are scheduled or otherwise instructed to execute at specific times, specific intervals, for specific lengths of time, or other metric desired by a user. The sets of instructions can run on a single thread or a plurality of threads, which are executed in accordance with a task schedule module, such as green threads. The task schedule module of the present application is useful to control execution of a task, delay further execution and then after a period of time, to control execution of the same or different task. Green threads permit stalling or delaying tasks on a respective thread, without halting operations of all threads or tasks.

The present application improves performance optimization, as libraries of script memory states can be maintained and provided to new script objects. Moreover, the present application can mix and match sets of script instructions with script memory banks, which can further be serialized and saved to disk/network. The sets can be loaded in the future on different client devices, which enable implementations, such as in gaming platforms, to manage units and weapons. For example, a script file creates a template script with common boilerplate, such as enum definitions, and then each new unit/weapon that is loaded is automatically given a copy of that memory. The present application utilizes speed improvements and is much faster, such as to copy some memory than to load and run script instructions to generate that memory. Benefits include providing many separate script objects that share the same memory, or the inverse, with unique memory but shared instruction sets. The latter is very useful, including for gaming platforms that have thousands of units of the same type in a game, and the present application avoids a need of having thousands of corresponding separate copies of that unit's script instructions. Instead, just one is shared.

In traditional multi-threading architectures, each thread must obtain an exclusive lock on objects in memory before the objects are read from or written to. This can quickly create performance bottlenecks and reduce—or even reverse—the benefits of multi-threading. The present application utilizes circular queues to perform lockless multi-threading, in which a circular queue is simply a generic data structure which contains, for example, the queue's size, an array of the supplied object type, and a current position in the queue. Additionally a set of methods is provided for interacting with the data structure. For example, calling a Get( ) method returns the current object, indexed from the array at the current queue position. In another example, calling a Push( ) method copies the contents of the objects in the array at the current queue position to the next location in the queue, wrapping it if it has reached the end of the queue size, and then increments the queue position by one. Still further, calling a Prev( ) method decrements a copy of the current queue position by one, wrap it if it reaches 0, and index the object array at that position.

With regard to the design philosophy that goes into circular queues, there can be many situations in which threads only require (or can be structured to only require) read access to data. In the example of collision detection, the current location needs to be read for every unit currently being processed. Being one sim tick behind in such a context is considered acceptable, as the respective positions of the units are calculated during the previous sim tick. The previous object can be freely read from, which contains all the units, while a different thread reads and writes to a current active object. The calculations take into consideration that the information is one tick behind. The results are produced at the end of the simulation step, as the application is aware that no one else has affected the respective data structures and the queue can advance.

A simulation's dictionary of units is an example of how a circular queue enables highly efficient inter-thread communication. Almost every thread needs access to the Units dictionary, as it is the main repository of the working copies of all of the current units in the game, indexed by their respective unique identifiers. The main simulation thread is responsible for scheduling all other simulation threads, such as the pathfinding thread.

Because the pathfinding thread requires information to be read from the Units dictionary potentially while being written to by a unit sim tick thread, it would normally require both threads to attempt to obtain a lock on that unit object before interacting with it, which would introduce a high amount of additional latency that largely negates the performance benefits of multi-threading. To countermand this shortcoming, the pathfinding thread simply calls Prev( ) to obtain the last sim tick's copy of the Units dictionary. This is perfectly acceptable behavior for a wide variety of game functions, as being behind by one sim tick frame is rarely noticeable for the vast majority of common game features such as pathfinding or collision detection. Since no other thread is writing to the Prev( ) copy of the Units dictionary, there is no need to acquire a lock.

This system can be further utilized by rendering threads. Rendering threads are guaranteed to only require read-only access to the Units dictionary. A second CircularQueue is created for their use, which behaves slightly differently: at the end of every SimTick( ), the contents of the freshly updated Units dictionary is copied into the next queue location in the rendering threads' Units CircularQueue.

Their CircularQueue's queue position is then incremented. Since there is no way to ever write to a location from the simulation thread that a rendering thread may be reading from, there is no need for locking. It also allows the simulation and rendering threads to run at different latencies without any effect on overall performance, as there is no need to signal, schedule, or otherwise block each other. In accordance with the present application, the movement of the circular queue is explicitly locked in order to facilitate the lockless manipulation of items it contains.

Referring to the drawings, in which like reference numerals refer to like elements, FIG. 1 is a block diagram illustrating a hardware arrangement in connection with an example system and method in accordance with one or more implementations of the present application and designated generally as system 100. System 100 can include one or more computing devices 105, which can provide features shown and described herein. Devices 105 can be connected to a network 110, which can be at least one of a local area network (LAN), wide area network (WAN), the Internet, one or more telephony networks or a combination thereof. Computing device(s) 105 can be at least one of computer, tablet computer, cellphone, or any other device suitable for providing goods/services herein, including in the form of a machine learning system. Further, one or more computing devices 107 can connect to device(s) 105, for example via an API, including to send/receive digital assets to be processed by device(s) 105. Moreover, device 105 can access or otherwise be associated with database 106, which can include digital assets and/or other data suitable for presenting the systems and methods shown and described herein.

Continuing with reference to FIG. 1, user computing devices 109 can connect to one or more devices 105 and/or database. Devices 109 can be a computer, cell phone, iPad, or any other suitable device that can be configured with an application and interface, such as shown and described herein.

Figure 2:
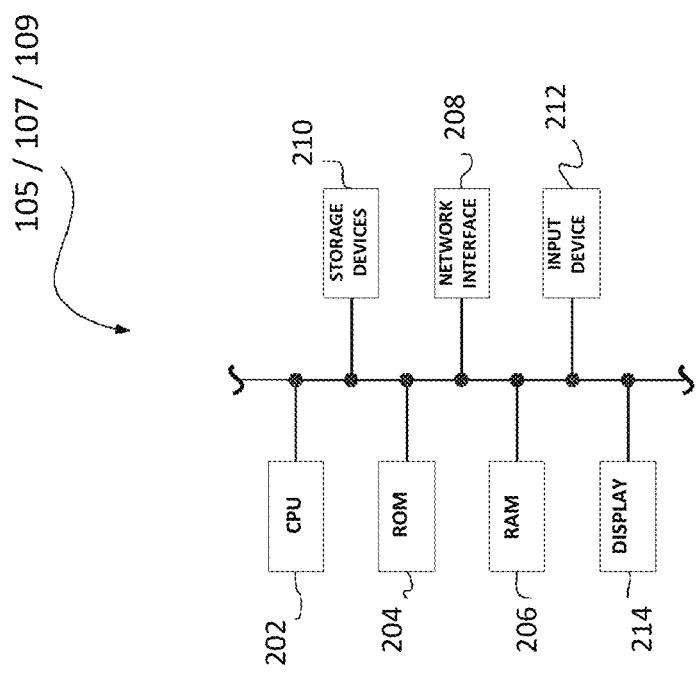
FIG. 2 shows example components and configurations of computing devices that can be used to implement the techniques described herein.

FIG. 2 illustrates example functional elements of one or more computing devices 105/107/109 and shows one or more processors 202 used to execute software code in order to control operation of one or more device(s) 105/107/109. FIG. 2 further illustrates read only memory (ROM) 204, random access memory (RAM) 206. Any other suitable volatile or non-volatile computer readable storage medium, which can be fixed or removable, can also be configured with any device 105/107/109 (not shown). FIG. 2 also includes one or more network interfaces 208, which are usable to transmit and receive data to and from computing devices across a communication network. The network interface 208 can be any interface that enables communication between the any of the devices shown in FIG. 1 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the devices and/or communication networks, such as private networks and the Internet. Such connections can include a wired connection or a wireless connection (e.g., using the IEEE 802.11 standard known in the relevant art) though it should be understood that network interface 208 can be practically any interface that enables communication to/from the processor 202.

Continuing with reference to FIG. 2, storage device(s) 210 are also shown, and can include any suitable storage such as a hard disk drive, CD-ROM or DVD drive, flash memory, rewritable optical disk, rewritable magnetic tape, floppy disk drive, tape drive, or some combination of the above for storing program code, databases, application code, and/or other content. In certain implementations, memory 204, 206 and/or storage device(s) 210 are accessible by the processor 202, thereby enabling the processor 202 to receive and execute instructions stored on the memory 204, 206 and/or on the storage 210. Further, elements include one or more input devices 212 such as a keyboard, mouse, touchscreen, touchpad, track ball and the like, and a display 214. The display 214 can include a screen or any other such presentation device that enables the system to instruct or otherwise provide feedback to the user regarding the operation of the system 100. By way of example, display 214 can be a digital display such as an LCD display, a CRT, an LED display, or other such 2-dimensional display as would be understood by those skilled in the art. In one or more implementations, display 214 can include or be configured as a virtual reality ("VR") device, such as a VR headset. By way of further example, a user interface and the display 214 can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the user to interact with the device to enter data, control functions, etc. So, when the touch screen is touched, interface communicates this change to processor, and settings can be changed, or user entered information can be captured and stored in the memory.

One or more software modules can be encoded in the storage device(s) 210 and/or in the memory 204, 206. The software modules can comprise one or more software programs or applications having computer program code or a set of instructions executed in the processor 202. Such computer program code or instructions for carrying out operations or aspects of the systems and methods disclosed herein can be written in any combination of one or more programming languages, as would be understood by those skilled in the art. The program code can execute entirely on one computing device (e.g., device 105) as a stand-alone software package, partly on one device and partly on one or more remote computing devices or entirely on one or more remote computing devices. In the latter scenario and as noted herein, the various computing devices can communicate via any type of wired or wireless network, including a local area network (LAN) or a wide area network (WAN), or the connection can be made to an external computer (for example, through the Internet using an Internet Service Provider). It should be understood that in some illustrative embodiments, one or more of the software modules can be downloaded over a network from another device or system via the network interface 208. For instance, program code stored in a computer readable storage device in a server can be downloaded over a network from the server to the storage 210.

Thus, the various components of devices 105/107/109 need not be physically contained within the same chassis or even located in a single location. For example, as explained above with respect to databases which can reside on storage device 210, storage device 210 may be located at a site which is remote from the remaining elements of device 105, and may even be connected to CPU 202 across network 110 via network interface 208. Accordingly, it is to be appreciated that several of the logical operations described herein are implemented (1) as a sequence of computer implemented acts or program modules running on the various devices of the system 100 and/or (2) as interconnected machine logic circuits or circuit modules within the system 100. The actual implementation is a matter of design choice dependent on the requirements of the device (e.g., size, energy, consumption, performance, etc.). Accordingly, the logical operations described herein are referred to variously as operations, steps, structural devices, acts, or modules. As referenced above, the various operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The nature of the present application is such that one skilled in the art of writing computer executed code (software) can implement the described functions using one or more or a combination of a popular computer programming languages and technologies including, but not limited to, C++, C#, VISUAL BASIC, JAVA, ACTIVEX, HTML, XML, ASP, SOAP, IOS, ANDROID, TORR and various web application development environments.

As used herein, references to displaying data on computing device 105/107/109 refer to the process of communicating data to the computing device across network 110 and processing the data such that the data can be viewed on the computing device 105/107/109 display 214 using a web browser or the like. The display screens on computing device 105/107/109 present areas within system 100 such that a user can proceed from area to area within the system 100 by selecting a desired link. Therefore, each user's experience with system 100 will be based on the order with which (s)he progresses through the display screens. In other words, because the system is not completely hierarchical in its arrangement of display screens, users can proceed from area to area without the need to "backtrack" through a series of display screens. For that reason and unless stated otherwise, the following discussion is not intended to represent any sequential operation steps, but rather the discussion of the components of system 100.

As used herein, the terms "function" or "module" refer to hardware, firmware, or software in combination with hardware and/or firmware for implementing features described herein. In the hardware sense, a module can be a functional hardware unit designed for use with other components or modules. For example, a module may be implemented using discrete electronic components, or it can form a portion of an entire electronic circuit such as an Application Specific Integrated Circuit (ASIC). Numerous other possibilities exist, and those of ordinary skill in the art will appreciate that the system can also be implemented as a combination of hardware and software modules. In the software sense, a module may be implemented as logic executing in a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware. Moreover, the modules described herein can be implemented as software modules, but may be represented in hardware or firmware. Generally, the modules described herein refer to logical modules that may be combined with other modules or divided into sub-modules despite their physical organization or storage.

Additional components, not shown, may also be part of the device 105/107/109, and, in certain embodiments, fewer components than that shown in FIG. 2 may also be used in other of devices 105/107/109. Thus, the techniques are not limited to any specific combination of hardware circuitry and software, or to any particular source for the instructions executed by the computing device 105/107/109.

It is to be appreciated that several of the logical operations described herein are implemented as a sequence of computer-implemented acts or program modules running on one or more computing devices that are operatively connected (e.g., mobile computing device, server computing device) and/or as interconnected machine logic circuits or circuit modules within the system. Accordingly, the logical operations described herein are referred to variously as operations, steps, structural devices, acts and modules can be implemented in software, in firmware, in special purpose digital logic, and any combination thereof. It should also be appreciated that more or fewer operations can be performed than those shown in the figures and described herein. These operations can also be performed in a different order than those described herein.

The present invention is now described with regard to a particular game-play implementation, referred to herein, generally, as "Endgame." Although the examples set forth herein, including with regard to Endgame, are directed to a single game, many other implementations are envisioned and supported by the teachings herein. Endgame is designed to support a multiplayer community. A persistent multiplayer galaxy makes Endgame a massively multiplayer online real-time strategy game ("MMORTS").

In one or more implementations, four unique factions bring plenty of opportunity for players to express themselves through their gameplay, and an extensively designed plot provides for a dark and intriguing backstory to motivate the battles they lead. Endgame features procedurally generated planetary terrain with recursive level of detail, supporting resolutions finer than 1 centimeter. The game is designed for cross platform support, and Endgame's technology stack is designed from the ground up to run on just about anything, including many major desktop, console, tablet, and mobile devices.

Robust modding is supported, including sim, unit, and user interface mods, in addition to the inclusion of the very same mapping and campaign scripting tools that are used to create the game, engage dedicated users and provide additional content for players to enjoy.

Three-dimensional content is split between planetary terrain and units. Planetary terrain can be provided in a clean and simple way that is appropriate for pristine, untouched worlds, with an emphasis on letting the atmospheric rendering effects drive the visual style of worlds. Units can share design elements with their faction, allowing the faction to which each unit belongs to be clearly identified simply by looking at it. Their functionality is readily apparent—assault bots are clearly differentiated from tanks, which are both quite different from engineers. In addition, units which share roles but are at differing tech levels and include that number of elements on them in some way. For example, a tech one engineer may have one construction arm, while a tech two engineer can have two, and a tech three can have three.

Units are designed with functionality and efficiency in mind to ensure plausible realism given the technology of the game's universe, and in keeping with the 'dirty realism' visual style. Each faction further applies its own interpretation of these rules to solidify artistic identity—for example, the Empire's units generally have blocky, bulky features, while the Nomads' units look jagged and patched together, compared to the sleek and futuristic units of the Elysium.

The present application includes a technology stack that has been carefully designed for multi-platform support. The engine's codebase, for example, has been designed so that the simulation layer is the component to synchronize across platforms. Therefore, each platform may have a custom rendering and UI layers to fully take advantage of their unique features.

Endgame can be considered a real-time strategy game ("RTS"). Each player begins with control over a single unit, the "Commander" that produces meager amounts of Mass and Energy, and has a limited number of structures which it can build. During gameplay, players harvest resources from the environment and use them to build units and structures, eventually upgrading them in order to produce units with increased power, range, and functionality to suit the situation at hand. These units are used to destroy enemy forces, with players typically fighting until one or both of their Commanders are destroyed, resulting in that player's death and deciding the victor of the battle. Gating Commanders to distant worlds to fight over them is the preferred method of waging war in the game's timeline.

Mass and Energy are the two collectable, expendable resources that exist in the game. Mass represents many types of physical matter. Everything has mass; from the mightiest unit to the smallest pebble. Mass can be harvested from planets. It is most frequently mined with mass extractors, units which can be constructed at specified locations marked on the map. Each vein of mass has a finite supply of mass, which will eventually be exhausted and cause the extractor to cease production. As with most units, mass extractors can be upgraded to increase their efficiency.

Energy represents many types of energy. Be that solar energy from the sun, or the electrical energy running a shield generator. Energy is the more plentiful resource, able to be generated from a variety of units. Varying types of power generators cost mass and energy to build, but produce unlimited energy at a slow rate. In certain environments, energy can be more efficiently harvested by wind, solar, hydro, or gas type energy production units.

Transmission of mass and energy is instantaneous. For example, mass mined from an extractor is instantly available across the map to a construction. However, mass and energy can be stored in specialized units. The player's economy can only store so much at a time; if production exceeds consumption while many storages are full, it is wasted.

Referring to the Commander, the Commander can be considered the player's main avatar. In the lore of the game, it contains the flesh-and-blood pilot. A stock Commander contains meager mass and energy production, a limited engineering suite, a powerful gun, and the potential to be upgraded to improve its offensive, defensive, and resource-generation capabilities. A commander has limited upgrade slots, and each choice down the upgrade tree locks off other potential choices. Furthermore, it is vulnerable while the upgrade is being constructed. In return, upgrades are extremely powerful and allow players to continue using their Commander offensively, leading their armies on the front lines.

The Commander is designed to provide the player with two distinct early-game choices: either leave the Commander at home and focus on winning through economic superiority, or sending it out to the front lines early on in order to win through early aggression.

Because the Commander contains the pilot, the player's avatar in game, it is important to make sure that it survives the battle. If it is destroyed, the player is killed, and many units under their command self-destruct. This makes it the player's most important unit in the game, and can carefully balance its extraordinary economic and offensive potential with its essentially infinite value.

The game can include structures which can transport matter and energy to any destination point in the universe, limited by the energy cost of operating. Costs increase with the amount of matter being transported and the distance it is being sent. Transporting to a receiving gate will significantly reduce these costs, but this is not always practical, such as when gating to a freshly discovered planet.

Once a player is gated to his/her destination world, (s)he can build one of three types of factories and then basic economic structures—factory, power generators, and then mass extractors. This ensures the maximum amount of player choice in what type of strategy they wish to pursue, as well as getting more units constructed as quickly as possible. Factories typically produce Engineers first, which will quickly expand to build more mass extractors and fuel the player's economy. Factories can later be upgraded to allow production of new types of units.

When a player first gates to a new world, (s)he begins with the same stock, non-upgraded Commander (an exception may be made if the gate is of small enough distance and with high enough power that (s)he can choose to bring their Commander's upgrades, or even other units with them, but this is a relatively rare scenario). This gives the player a vast amount of freedom for innovation in how (s)he chooses to upgrade and what units (s)he chooses to pursue, and by extension, what tactics and gameplay styles are available.

The player's first few units are relatively small and weak. As (s)he harvests more resources and upgrades factories to higher tech levels, (s)he will be able to produce larger and more advanced units with additional functionality. Units can be organized into one of five tech levels, each featuring progressively more expensive and more powerful units. Player armies generally shift as the game progresses, with the production of lower tier units ceasing in favor of higher tier units, but with plenty of exceptions and opportunities for interesting mixes of forces—e.g., a T2 mobile stealth field generator hiding a cheap group of T1 mobile artillery, sent far across the map in the hopes of taking out unprotected engineers from a careless enemy.

Tech 1: These units are small and lightly armored, but are cheap and have fast movement speeds, useful for quickly 'spamming' an army to cheaply control territory. Tech 2: Larger and moderately armored, with many more opportunities for faction-specific diversity and niche purposes. This is the point of the game in which each faction's unique playstyles really begin to shine, giving players access to things like long-range missile launchers, stealth, and mines. T2 units are often constructed with a specific plan in mind—the difference between "I need more tanks to hold this line" and "I'm going to build mobile missile launchers to start sieging this dug in enemy location". Tech 3: These are heavy, slow, and highly armored, these units need significant support from T2 and sometimes T1 units in order to reach their maximum effectiveness. Examples include even more specialized technology such as dedicated anti-shield units, EMP generators, high-burst, low-DPS bunker busters, mobile artillery, and high-DPS frontline tanks. Successful use of mixed-army tactics is crucial to prevent that costly T3 tank from being overwhelmed by swarms of lower tier units. Nuclear technology is available in this tier, in the form of missile launchers and strategic bombers. Tech 4: Experimentals that are truly giant units that, when properly supported, can singlehandedly change the course of the battle by breaking through defenses and mowing down everything in their path. Iconic, (s)he is also responsible for defining each faction's personality. Tech 5: Orbital weaponry that is designed to break the toughest stalemates, costing incredible amounts of time and resources, but able to almost singlehandedly provide control over an entire planet.

It is recognized that many tech levels can result in units that tend to feel redundant if they fill similar roles. For example, if a T2 tank fits roughly the same role as a T1 tank, there is little use for T1 tanks once the player has T2 tanks available. While there are valid arguments for and against this gameplay style, interestingly, most players seem to prefer this progression of obsolesce. Lower tier units can be provided valid niches, even when late game technology is in play. Lower tier units can be provided faster movement speed than higher tier units, balanced out by shorter weapon ranges in order to prevent indefinite kiting. This allows lower tier units to cover distances in a shorter amount of time and react to faraway threats and opportunities faster, at the cost of sheer efficiency.

Moreover, lower tier units can include ensuring that niches do not overlap. For example, T1 mobile artillery is fantastic for providing constant damage per second ("DPS"), which can be calculated by the sum of the damage potential of a unit's weapons, divided by rate of fire over one second of simulation time), against stationary targets, while the T2 equivalent, mobile missile launchers, provides lower DPS but can siege defenses that would outrange and cut down T1 artillery. T3 mobile artillery is imprecise and slow, but highly effective at sieging armies of mobile enemies from afar, softening them up for the rest of the army when they close to direct fire range.

Below is an example sampling of the types of units and the theaters in which they interact:

Orbital units are higher than Air units, and are primarily reserved for experimental T5 units. For example, the Zeus, the Empire's T5 satellite defense weapon is a kinetic bombardment weapon that drops tungsten rods from orbit onto the target to inflict massive damage. It can be shot down by T3 anti-orbital missile silo structures, which construct and launch missiles capable of reaching a high enough altitude to take it out. However, it can affect any land based target within its operational range.

Air—primarily includes air superiority fighters, bombers, gunships, transports. Air superiority fighters can attack other aircraft, while bombers can attack land or sea targets. In addition to other air superiority fighters, they can be shot at any land or sea unit equipped with anti-air weapons. Torpedo bombers may attack naval units, but can reach submersed units as well.

Land—Tanks, Commanders, artillery, and most structures. The Commander can fire at other land units to start with, but may be upgraded with torpedo tubes which can allow it to attack naval and submersed threats as well. Some land units are equipped with anti-aircraft weapons, and there are defensive turret structures for land, sea, and air threats.

Sea—Naval battleships, battlecruisers, aircraft carriers, destroyers, frigates. Cruisers are excellent against air and their missile racks can siege land and other stationary naval targets from afar, but are helpless against direct fire naval weapons and submarines. Frigates can effectively take out lightly armored naval threats, but cannot save themselves against air or submarines. Destroyers rule the seas against submarines and frigates, but have no air defenses.

Submersed—Below sea level, primarily used for submarines. Low end subs have limited, but deadly interactions with other sea layers: they can stealthily acquire intelligence on the enemy's naval fleet, and perform hit and run torpedo attacks on any submersed or sea threat. While safe in the depths from direct fire naval weapons, they cannot defend themselves against aircraft equipped with torpedoes.

When any unit is destroyed, its wreck is left on the battlefield. A tank's wreck can rest at same position it was destroyed at, while an airplane's wreck may tumble to the ground in a physical simulation. These wrecks can then be reclaimed by engineering units, providing 81% of the unit's original mass value over time, for example based upon the construction time of the destroyed unit and the build power of the engineers reclaiming it. In this way, very complex units cancan be constructed that require more resources in the form of engineers and also take much longer to reclaim as opposed to, for example, a T1 tank.

Since any player's wrecks can be reclaimed, it is rarely efficient to send units on suicide missions, as the opponent can simply reclaim them and come out ahead. This encourages thoughtful, strategic gameplay, rather than mindlessly sending units to their deaths.

Being able to destroy enemy's structures can be of secondary importance to being able to hold onto their wrecks and allow fragile engineers to acquire their resources, emphasizing the importance of territory control. Units that no longer fit an army's composition may be efficiently recycled by self-destructing them and reclaiming their wrecks. This can even be used as a last-ditch effort to sacrifice infrastructure in order to get the last bit of material needed to finish an experimental unit.

Just as in real warfare, military intelligence is of the utmost importance. The fog of war prevents players from having a complete picture of what their enemies are up to. A robust system of radar is used to detect, and prevent the detection of, what a player is doing by displaying additional information on the HUD, overlaying iconography over the three-dimensional position of where the unit would be if it were revealed by direct line of sight. Radar installations are fragile and have high energy consumption when active, but can detect enemy units in general terms—the rough size of what they are. It is up to players to draw their own conclusions as to the makeup of an army revealed by radar. This can be taken advantage of by clever players, fabricating armies of cheap units to send as a distraction while their real force hopes to surprise them from another direction. As players reach higher tiers of technology, more options for offensive and defensive usage of intelligence can open up. Radar jamming units create a myriad of false positive signatures, hampering players' ability to determine what is real and what is an illusion. Stealth hides units from weak radar, allowing players to try to sneak forces behind enemy lines. Eventually, cloaking units have the ability to render themselves invisibly to most radars and line of sight, requiring even more advanced radar installations to detect.

A representative slice of units with these features: T1 radar is cheap, very lightly armored, and weakly reveals a small radius around it. T2 radar weakly reveals a moderate area around it. T2 mobile cloaking units render themselves and units within a short distance around them invisible to radars. T2 mobile jammers produce many false positives around themselves, potentially giving opponents the impression that an army revealed on radar is much larger than it actually is. T3 radar is expensive, and weakly reveals a very large radius around it. A smaller radius is strongly revealed, breaking through stealth and jamming. T3 cloaking makes itself and the units in a small area around it invisible to both weak radar and direct line of sight. An Eye, a T4 experimental long-range radar installation, provides direct line of sight to a very small area it is directed at, anywhere within its operational radius. It pierces many forms of stealth and cloaking, and is great for spying on heavily entrenched enemy bases. A Soothsayer, a T4 experimental defensive radar installation, provides true vision in a small radius around it—similarly piercing many forms of stealth and cloaking. This is best used as part of an entrenched base, to detect attempts at using advanced cloaking or stealth in hit and run attacks.

Sonar is the naval equivalent to radar, which includes a separate set of units and balanced around the ranges of naval units rather than air and land units. Line of sight is generally better than most types of radars, and is implicitly provided by any unit under the player's control. A T1 tank can reveal the area around itself, for example, as is traditional with most RTS games. True sight is best acquired later on through the use of dedicated spy planes, aircraft that are very fast, very fragile, but equipped with their own miniature omni radars. While they can likely be shot down over entrenched hostile forces, the information they gather up until that point may be worth their cost many times over.

Endgame uses a system of 'soft' counters. Most units are designed to efficiently destroy another type of unit, while possessing weaknesses to other types of units. However, this does not mean that a single anti-air turret renders an entire air force useless—far from it. Due to projectile based weapons being physically simulated, there is plenty of opportunity for a clever player to exploit inattentive enemies. That said, there are many counter triangles built into Endgame's units, forcing players to scout their opponent and choose their army's composition wisely in order to avoid letting their army of artillery get wiped out by an enemy's raiding party of assault bots. An example of an early game counter triangle is Point Defense beats Tank, Tank beats Artillery, and Artillery beats Point Defense. By following this simple unit design philosophy, players cannot simply build one type of unit. They are forced to adapt their strategy to the unique situation at hand, fully utilizing many of the possibilities of their army.

In terms of scope, a campaign can include a set of missions, each including scripted sections of gameplay. A mission may take place on one planet, or even involve gating to multiple planets. Missions may be replayed once completed, and cutscenes may be used to help move the story along between them.

Strong multiplayer community is integral to the longevity of Endgame. The engine is designed from the ground up to fully support multiplayer, and in a manner that is both far more tolerant of suboptimal network environments with high latency, while requiring far less bandwidth than traditional networking technologies. Multiplayer support is designed to be a seamless component of Endgame's experience, readily available to those who wish to play with their friends, and a central destination for competitive players.

Ranked matches are entered by the player selecting the game mode and which faction (s)he would like to play as, which can enter her/him into a queue to search for similarly skilled opponents. When a match is found, a map is selected from the current pool of curated, rotating ranked maps, both players are gated to it, and the game is begun. Operational limits, limiting the area of the map upon which units may travel, can be enabled in order to prevent losing opponents from drawing out lost games to frustrating lengths. When one player's Commander is destroyed, the victor is decided, and rank is adjusted.

A teamgame ladder can be included, and each player's rating is accurately affected in games with more than two players. Once many players on the team are satisfied with their faction choices, the search is begun, and they are put into a queue to search for equally skilled teams. Once found, the game plays out much the same way as the 1v1 ladder, simply with more players.

Each player can have two ratings: one for one versus one ("1 v 1"), and one for teamgames. The reason for this is that despite the popularity of teamgames, most players tend to primarily respect the 1v1 rating, as they believe it is a truer reflection of the player's individual skill. One rating can be used for many sizes of teamgames, however, from 2v2s, 3v3s, to 4v4s and larger.

The map pool can be different from the 1v1 pool, with some 1v1 maps not being large enough to support more players. They can be rotated at the same time, but carefully curated with different goals in mind—teamgame maps can be larger and provide more niches for emergent teamplay strategies to form.

"Galactic War" ("GW")—a new game type that sits on top of multiplayer. Each player selects a faction before joining, and fights across a galaxy of procedurally generated planets to hold territory for their allies, with the ultimate goal to take over the galaxy and eradicate every other faction.

The present application includes persistence. Upon starting the game mode, for example, the player is allowed to select which quantum gate to spawn his/her Commander, which can be any active quantum gate in the galaxy built by his/her faction. From there, the player is free to gate to any planet in the galaxy within the rules described in the Gameplay section for quantum travel.

When a player is killed, (s)he is prevented from immediately rejoining the same location—due to the vast distances involved, (s)he may be allowed to rejoin on an outpost at an opposite corner of the galaxy. Depending upon the results of playtesting, however, the total number of lives per player may be limited for each season of GW, in order to ensure that player deaths are meaningful and lasting progress may be made for territory control.

At the end of each "season" of GW, players are given rewards for their participation, and after a short resting period, the galaxy state is restarted so that territory control may begin anew. Thanks to procedural planet generation, an effectively infinite variety of planets and galaxies can be created.

Territory control is fluid, and control over planets can be dictated by whether or not players of the same faction can hold it or not. Players may not be restricted from gating to other planets other than the resources required to do so and quantum wake fields, planets are unlikely to remain safe for long unless a concentrated effort is made by players to keep it secure.

The primary advantage of holding territory is access to the mass that is available on it. Vast quantities of mass can be required to construct giant, planet-destroying experimental weapons. Players can work together to efficiently build and defend these long enough to deal lasting damage to their rival factions by destroying their planetary resources.

In order to include player versus environment (PvE) in GW, a fourth, alien faction can be included in GW. Hostile to many player factions and controlled by AI, PvE players have activities to do by clearing them out of planets. Furthermore, where they are spawned in the galactic map may help maintain the balance of power in seasons—for example, if one faction is being crowded out, spawning several alien attacks on neighboring factions may help them get back into the game.

The present application further support modding, thereby making it easy for players to create their own custom content. Mods can be separated into several different types, each with different rules and permissions. A central repository can be provided for players in which to upload their mods to, allowing content to be seamlessly distributed through the game's client. Content can be automatically downloaded when players host games with mods.

A mod and map vault, each including a search and rating system, can also be integrated into the game's client, allowing players to search for new content without needing to exit the game or follow complicated installation instructions.

The mapping tools used to create the maps for campaigns and the initial map pool can be integrated into the game's client, allowing players to create and edit their own unique maps. The present application's planetary technology allows user-modified map data to be stitched into a procedurally generated world, with the mapper being able to control the planet's initial seed and then further adjust it to fit his/her vision.

Because the tools are a part of the game, they can be usable on non-desktop platforms such as consoles, giving more players access to the tools to create their own content. Players have the opportunity to upload their maps to a map vault, which is shared across many platforms. Other players can be able to search through, download, rate, and review these maps. If a player hosts a game with a custom map, any players who join can automatically download it as well.

UI mods are a lesser restrictive type of mod. By declaring ones' mod "UI only," the mod's access to the simulation is restricted, with the parts of the simulation that are exposed to the UI layer being available. In return, the UI mod may be freely used by players independently of other mods that are running in the current game session—in other words, many other mods require the other players in the session to be using the same mod as well, while UI mods do not share this requirement.

Unit mods can modify existing units, or add entirely new units to the game. By using a layered hooking system, conflicts with multiple mods that modify the same unit are reduced, because new or changed properties are applied for each unit. Thus, if one mod makes a tank have additional health, while another mod gives it a new weapon, both of these mods may be used simultaneously and the unit can function as expected.

Unit mods, just as with maps and sim mods, can be automatically synchronized with players when they join a custom lobby. Simulation mods can be more expansive, given full access to the entire simulation. Sim mods can change the game in radical ways, allowing players to craft entirely new gameplay experiences.

Virtual reality ("VR") is a burgeoning field, and Endgame is a natural fit for the deeper immersion it allows. Endgame's technology has been designed to support VR. Endgame's gameplay can use VR headsets, by switching to a rendering output mode compatible with VR. Due to its rendering system including a queue of rendering instructions generated by UI elements and/or units themselves, which are later synchronized to the rendering thread and executed with the present camera transform, supporting the multi-rendering paradigm required by VR is implicitly supported by simply executing these commands twice, once for each 'eye' with the required offset. With advanced user input technology including 'wand' controllers and finger and gesture recognition devices, more natural input methods are supported—for example, being able to pinch and zoom terrain to move the camera, or by drawing a selection box around units, giving them a movement order to another part of the map.

All UI panels can be drawn as textured quads in three-dimensions, with a condensed UI similar to a touch interface. In addition to textured quads, full 3D models and 3D raycasting for mouse interactions are fully supported. The engine supports projection of three-dimensional rays to calculate positions on terrain in three-dimensional space, this can be expanded to include the UI. Furthermore, the game's chat and community interfaces can provide a native VR experience.

Endgame's engine is split up into three self-contained layers: simulation, rendering, and user interface. Keeping each layer separate is important in making cross platform support as simple as possible. The simulation layer is identical across many platforms, and conforms to the strictest C# specification, while the rendering and UI layers may be tailored to each platform.

The present application includes a simulation layer that contains features of the game, and functions independently of the higher layers. Servers can run the simulation layer heedlessly, without the overhead of a rendering or UI layer. It can be deterministic, relying upon integer based math for many simulation variables. The simulation uses several points of reference to refer to positions on a planet: Planet face (which of the six faces of the planet the position is on); PatchPosition (a pair of unsigned 64-bit integers referring to the X and Y coordinate of the patch position on a planet's face); and WorldPosition (a PatchPosition combined with a planet face index, and two 32-bit integers containing the local position of the object relative to the PatchPosition). Using a default scale of roughly the same size as planet Earth, a 200-bit position value allows for a greater than centimeter level of detail. If it is upped to 264 bits by swapping the 32-bit integers for unsigned 64-bit integers, that level of detail is increased to roughly $1.019 \times 10^{17}$ meters. This level of detail may be unnecessary for Endgame, and while the performance impact and memory impact would be negligible, it is not included for ease of use in creating sane unit movement speed values.

Planets are composed of six square heightmap patches. The simulation layer does not care about LOD, as it operates on one: one TerrainPatch per PatchPosition. Each TerrainPatch stores the patch's array of heights, which are used to calculate units' vertical positions. Structures placed on the map can be added to a StructureGridData patch. It is the same size as a TerrainPatch, and composed of a byte array—0 indicating that the space is empty, and any other value indicating that it is filled by a structure. This is added to when construction is begun on a structure, and when a structure is destroyed, its entry in the grid is removed. This StructureGrid is used in the pathfinding engine to define impassable terrain, so that units can properly avoid player-created structures.

Collision detection is performed via grid registration. Every time a unit is updated, it is responsible for updating its accompanying registry in the collision detection grid. The default grid size is equivalent to one PatchPosition, which makes indexing simple. If a unit, or the collision it is being tested against, is near an edge and exceeds the dimensions of the grid, the adjoining grids are checked as well. Projectiles are conceptually similar to units, but they contain vastly simplified update logic. As such, they inherit from the base Projectile class and are updated and drawn separately. They are comprised of a WorldPosition and an unsigned 64 bit integer representing the height over the terrain. The height value is necessary because many conventional projectiles (bullets, bombs, etc.) are physically simulated. Projectiles utilize the same grid registration system as units do for efficient spatial partitioning.

The simulation can be changed via the execution of a Command. Many simulation input is encapsulated in these Commands, from the creation of units, to the issuing of move, build, and attack orders. A CommandQueue of future orders is kept, which is synchronized over the network and executed at the same simulation time. The simulation that the player sees can be delayed by a default value of 500 ms to accommodate for network latency and ensure that commands have time to propagate over the network before they are expected to be executed. For example, if a client's heartbeat network message is not received within the expected 500 ms value, it is determined to be running slowly, and the other clients may automatically pause until the slow running client catches up.

UnitOrderVisualQueue is an interface layer designed to abstract and cache the process of the simulation 'attaching' orders to units. This allows orders to be changed by the player in an efficient, deterministic manner, by encapsulating such a change as another order. Take the example of two movement orders given to a group of units. Before either of them are completed, the player 'drags' the first movement order to a different location. This triggers a DragCommand in the simulation, which fetches the order referenced (the first move order) and replaces it with the new one. As this happens as part of a Command, it is deterministically executed across many clients, despite conceptually being a player UI issue.

Pathfinding is a complex process of the simulation, and includes the following. When a movement order is executed, the angle between the unit's current location and its destination is calculated, and the unit begins moving in this direction. The start position and destination are sent to the pathfinding manager to be queued. It is expected to return a path within X ticks, and can block the sim if X tick is reached without a valid path. HPA* is used on the high-level pathfinding grids to get the high level path. Flowfield is calculated for each grid. When the unit has its final path, it is a matter of indexing the flowfield at its present location to get the desired direction in which to move. If the movement order contains more than one unit, and it is a formation move order rather than a "get there asap" move order: The frontmost and centermost unit in the formation is designated as the 'lead' unit; other units attempt to orient themselves around the leader, as defined by their formation; if their oriented position is blocked, they can act as 'free agents' (pathfinding along the lead unit's path) until it is unblocked and they can return to it.

Local collision avoidance is optionally enabled on units in conjunction with their higher level pathfinding. Both continuum crowds and RVO have been implemented, with the latter providing a secondary preferred velocity vector which is utilized when selecting a unit's desired movement. This is controlled via the self-contained RVOObject class that each Unit may instantiate, and is merged in their physics code.

Networking commands are serialized into packets and sent over the wire. The simulation layer is responsible for deterministically ordering them (presently, by the simulation timestamp, and in case of conflicts, ordered by the issuing player's username).

Commands are sent as soon as they are created by the UI layer, giving the simulation a built-in resiliency to networking latency: since a sim command can be delayed by 500 ms once it is registered, the command packet has 500 ms to reach every other client in the session before its delay can result in a simulation's state lagging behind.

Endgame's session networking functions equally well with direct P2P connections, or with a centralized server. In the latter case, player command packets are sent to a centralized server instead of other players; the server is then responsible for resending those packets to each client in the simulation.

Galactic War requires the use of dedicated server(s) in order to dynamically create sessions between players, but its requirements are trivial: each tick, every player sends their Commander's position to the server, and if it is in range of another player, it introduces them.

Endgame can optionally simulate the game's simulation on the server as well, but this is likely to be redundant, as attempts to tamper with a client's simulation can result in a desync. However, in cases where computational power is extremely limited, but network bandwidth is not, the game's sim may be executed on a server and unit results sent to the client—such as a player running the game simulation on their gaming computer, but sending the simulation state to their mobile device in order to maintain a high sim speed.

The simulation is designed to be thread safe, with clients reading from its most up to date snapshot as needed. It is locked for a very brief time in order to update the snapshot with new data. Each main component (unit, pathfinding, projectile, collision) are treated in the same way, so that each may be run on their own thread. Indeed, an optimal multi-threading architecture for Endgame would involve 7 separate threads: 0: UI, Blocking rendering operations (e.g., locking and sending vertex buffers to GPU); 1: Rendering operations (egg, calculating new terrain chunks); 2: Simulation, sync thread (orchestrates threads 3-6 and then hashes and compares their results; also checks to see if we're running slowly); 3: Simulation, unit update thread; 4: Simulation, projectile update thread; 5: Simulation, collision update thread; 6: Simulation, pathfinding thread.

Tasks can be merged based on core load if fewer than 7 threads are available. Performance profiling may need to be done to determine the most efficient grouping of threaded tasks.

Planets can be generated by three-dimensional noise. Terrain generation can be considered locked so that the same set of algorithms may be implemented on the rendering side, optimized for recursive terrain generation at arbitrary levels of detail. A GPU implementation may be viable on some renderers to increase performance.

Props such as rocks and trees, rendering information such as textures to blend between, and game objects such as mass extraction locations, can be generated at the same time. It is important to keep in mind that these algorithms rely upon integer math, and remain deterministic.

Moreover, biome system can be created, each biome containing presets for different types of terrain environments such as deserts, forests, mountains or oceans. A planet will then include one or more biomes stitched together across its surface.

Building on this feature, fractal generation of planets can be split into an explicit preprocessing step and a real time step. The preprocessing step can run once upon the initial seeding of the planet and execute for some length of time in order to utilize fractal and/or other algorithms to develop planetary terrain features via tectonic plate simulation. These data are then stored for later use by the real-time generation system, which simply indexes into the stored data for the given area (such as by determining a specific tectonic plate the given coordinate refers to). The real-time generation system then uses that data to drive fractal generation, such as biome type.

Moreover, patches of editable terrain are stored in the simulation layer, and can be used to override the output from the preceding section as needed. To optimize rendering, whenever modified, terrain can be propagated back up through a pyramid data structure, with level(s) of detail halving at each step, so that the rendering layer need only read data from the slice at the level of detail it is currently rendering. Support for importing chunks of custom terrain is provided, thereby smoothly interpolating between the loaded terrain and generated terrain to allow for seamless stitching of custom maps into planets.

As terrain changes, it is necessary to update the data structure of impassable tiles to retain accurate pathfinding. If a grade between two points is above a threshold, it is considered impassable by the pathfinder, so that units will not try to move up and down steep cliffs.

Runtime interpretation of scripts is important to fully unlock the power of Endgame's engine for modders, as well as to make building content for the game as efficient a process as possible. Custom unit behavior and logic is encapsulated within scripts, with the engine handling low-level functions such as pathfinding and collision detection.

Rendering can be provided in an entirely separate layer, and can thus vary drastically based on platform. A min spec, high performance renderer is desirable to maximize performance on low-end devices, such as bare-minimum wireframe rendering.

The flagship platform, PC, should take advantages of the latest graphics technologies in order to maximize graphical detail. Care must be taken on each subsequent platform in order to ensure that their renderers are designed to fully take advantages of their hardware.

An important aspect of rendering in Endgame is the dynamic camera architecture. A significant challenge to any game with large scales is floating-point inaccuracy. Therefore, Endgame uses a dynamic scaling system to keep the rendered objects in the range of accuracy of single-precision floating-point values. Furthermore, the camera is treated as the origin of each frame, with many other objects to be rendered oriented around it. Simulation space is comprised of integer values that are produced by the simulation's terrain generator. These are translated to 64-bit world space coordinates—64-bit doubles have more than enough precision for even the largest of planets. Finally, at render time, world space coordinates are translated to local space, which is relative to the camera.

As terrain rendering is a complex example, it will be used to describe the process in detail: Each terrain patch contains a 64-bit Origin position, and the patch's subdivision level. The camera uses 64-bit values to maintain its position in world space. When a planet is rendered, each of the six quadtree faces are recursively tested for being in view by the camera. If they are, they are added to a queue to be rendered. This queue is iterated through to get the maximum subdivision level in view. This level is used to calculate the renderer's scalar matrix, which is 2 to the power of the current level.

For every patch to be rendered: Calculate a world matrix to convert its position to local space by subtracting the camera's position from the patch's origin, multiplying by the scalar matrix, and converting to 32-bit single precision floating values. Render the terrain patch with this world matrix.

With unit counts reaching the tens of thousands, instanced, animated rendering is provided. Aggressive LOD'ing can ease performance issues. Additionally, dynamic billboarding may be employed to further enhance performance with extreme numbers of units being displayed at very long distances.

The UI layer can be specific to each platform, as it controls how the player can interact with the game. As such, the UI layer for a tablet mobile will look very different from that for a PC or a console. The UI includes 2D elements, which can be interacted with based on input from the controlling device, be that a mouse and keyboard, a controller, or a touchscreen. Depending on the UI state, it may create Commands and send them to the simulation layer. The UI layer can be responsible for determining what units the player has currently selected, and the Simulation layer can originate where those units come from. For example, when a player issues a Move order on those units, the simulation layer is invoked to do so. Moreover, 3D models are supported.

The script-driven U/I supports arbitrary 3D models with arbitrary rendering and graphical effects. This can be accomplished via a host-code improvement to a DrawUI function exposed to script, which now optionally takes a string referring to the name of a loaded UI model or element. It is then queued for later rendering at 3D coordinates which are automatically inferred based upon the 2D coordinates the script provides, and includes support for automatic layering of elements via a painter's algorithm.

In script, consider the case of a user drawing two 'panel' objects at the coordinates 0, 0, 1, 1, in which 0 is the X-axis coordinate (in a range of 0-1), 0 is the Y-axis coordinate (in a range of 0-1). The width/height values (1) refer to relative coordinates in 0-1 space, as the X and Y coordinates are. Use of a relative coordinate scheme in this way eliminates a need to know in advance particular variables, such as resolution, monitor width, aspect ratio, or other physical rendering concerns. In such case, the two objects are positioned directly over each other. When each draw function is executed, those coordinates are resolved to a resolution-independent coordinate system via scaling them by a known value, typically less than the minimal required resolution for the game's rendering. A two-dimensional array of integers is kept, and the transformed coordinates that the element occupies are "painted" into it by incrementing each integer at the covered coordinates. The highest value is then returned, which is then used by the 3D rendering system as an offset to the 3D object's Z axis. Thus, objects that were queued for rendering later are pushed on top of objects that were queued for rendering earlier. This enables script users to write arbitrary UI rendering scripts without requiring Z axis positioning of elements. Additionally, the 3D renderer intelligently scales the 3D objects based upon the resolution-invariant coordinate system, thus implicitly supporting arbitrary display resolutions and aspect ratios without requiring explicit programming support.

Furthermore, arbitrary 3D models can be loaded and used for drawing, including those with arbitrary rendering paths including advanced effects and shaders, thus allowing artists and designers to build up increasingly complex and fancy user interfaces while requiring a minimal amount of scripting knowledge and no changes to the underlying host code.

Rendering can be a 2D and/or 3D system, which eases VR integration such as by separating each panel into its own textured quad so that it may be naturally rendered in three-dimensional, such as described herein.

As noted herein, floating point numbers have insufficient precision with which to accurately represent positions on a realistically sized planet. While double precision floating point numbers would partially solve this issue, they would still not be deterministic across different platforms that utilize different IEEE floating point number specifications and would set a hard limit as to the size and level of detail possible within the game's world.

In the present application, a planet is spatially partitioned into equal sized grids. Grid registration is then utilized for each object that is within the planet's atmosphere. Each grid can optionally contain a sub-grid, and each of those may contain another in order to reach any arbitrary level of precision desired—this allows for effectively infinite level of detail at an extremely low performance and memory cost, as each additional grid level only needs two sixty four bit numbers to denote the location on the grid, and one byte on the highest level grid to denote its planet face. This is conceptually similar to a quadtree, which is traditionally used for terrain culling, except in this case it is customized to create a recursive coordinate systems.

Planets can be initially generated via fractal noise. In order to maintain determinism across different clients and platforms, this is done with fixed-point math. This is an important distinction, as the fractal noise algorithms typically suggested for planet generation use floating point math—and titles which feature procedurally generated planets anecdotally appear to be using this methodology. One example of this can be seen in No Man's Sky, in which players coordinated over the internet to simultaneously visit the same planet in their universe, and were able to note small differences in the planet.

Ensuring determinism in planetary terrain generation is an important component to support multiplayer, as detailed below.

There are three separate coordinate spaces that are utilized in the engine for different purposes: The simulation space uses the planetary coordinate system described above. It is implemented entirely in fixed-point math. The world space uses double precision floating point values, centered at the planet's center. This coordinate space is primarily used for speeding up certain types of client-side calculations, such as occlusion querying objects around the camera before submitting them to the renderer. The camera space uses single precision floating point values, centered at the camera's current location. This coordinate space is what is used when rendering objects, as it is optimized to fit within the single-precision limitations of modern GPUs without affecting the simulation.

Dual layer lockstep deterministic simulation is treated in much the same way as one would treat a virtual machine for script: the way to interact with the simulation is via adding instructions to its queue. These instructions are distinct from commands that players input. By making this distinction and having two separate layers, there is much more functionality that can be made possible and can be run more efficiently.

For example, a player moves a unit. When the player clicks on a destination, a Move UserCommand is generated with the IDs of the selected units and the destination. This is timestamped with the sim's current clock and sent over the network to many other players in the session. When other players receive this UserCommand, it is added to the queue to be executed, and any pre-execution logic is executed. At an agreed-upon X number of ticks in the future, every client executes the UserCommand on the same tick. In the Move UserCommand's case, it generates Move UnitCommands for each unit that had an ID stored in the list and assigns them.

The pre-execution logic step is another important improvement because it allows for asynchronously fetching and caching data needed for the command ahead of time. In the case of a Move order, pathfinding data for static geometry can be acquired as soon as the order is received, and merged with pathfinding data for dynamic geometry when it is later executed.

Because Endgame is an RTS, its physics can be simplified in a very important way: skipping a dimension. Units have rigid body dynamics in a two-dimensional physics solver rather than three dimensions. This is because the 'bounce' of units on the Y axis is generally unnecessary—land based units always drive on the ground, air units control their Y axis independently using a different, simplified simulation, orbital units generally maintain a static height, and so on. Calculating 2D physics is much less computationally expensive than three-dimensional physics, which is critical in a game of Endgame's scope.

Even though units move with 2D physics, true three-dimensional collision detection for unit and projectile hit-boxes is performed. This way, bullets can accurately hit and miss their targets, even though they are using a 2D physics simulation. Because the coordinate system implicitly relies upon grid registration, the present application operates in a highly optimized manner in which to query which objects to test for collision response: those who are in the same or adjacent grids and whose distance between their 2D points is below a threshold.

The critical optimization that makes this technology work across platforms is relatively simple: whenever collisions are tested between two objects, the second is transformed to the first's local coordinate system. This way, the coordinates of the two objects and what format they are stored in are irrelevant, as the physics solver cares about the relative differences between their position and orientation. This allows extremely accurate, deterministic fixed-point physics solving in a game universe of any size. This method is contrasted with traditional physics engines, which stores the world coordinates of each object and tests against them. This was unsuitable for the coordinate system of the present application due to the extremely large numbers that are in use.

Terrain modifications can be stored for every loaded level of detail of that chunk in a pyramid data structure. The highest level contains the top face of the planet, with each subsequent split holding the next level of detail in much the same way as a quadtree. When planetary terrain is generated, it checks this data structure to see if it has a record loaded for its current level of detail and grid position—if so, it applies the terrain modifications stored within.

A modification to the terrain may be submitted at any level of detail, and changes will be automatically propagated through every other level of detail. For every level of detail lower than the one at which the change was submitted, its changes are simply downscaled and applied, in a manner very similar to texture mipmapping. For every level of detail higher that is currently loaded in the modification pyramid, the modifications are propagated with filtering in order to account for the lowered resolution. This can be performed to the maximum level of detail utilized by the simulation in terrain calculations—anything at a higher level of resolution is interpolated at render time by the terrain renderer. This step can be performed on the client side rendered without determinism for increased performance, as it is purely a visual enhancement which has no bearing on the simulation's activity.

In order to create a MMORTS, a significant networking hurdle was overcome to get players into the same sessions and sync them as they move across worlds and through the universe as they please. Traditional games, especially in the RTS genre, utilize a lobby system. Players host or join a lobby, wait for it to fill, set the game's options, and players are eventually launched into the game session. While Endgame implicitly supports this method, its primary feature is its dynamic sessions. The player's avatar is the center of the world to them. They may control units which are within a large, spherical operational zone around them that is roughly 80 kilometers in diameter. If the player's avatar leaves units behind outside of its operational zone, they will self-destruct.

Because of this design, the player's simulation cares about what units are within its operational zone. Every tick, it sends its global coordinates to a server, which checks its position with many other players. If they enter each other's operational range (multiplied by two, to prevent their previously-unknown units from suddenly popping into view), the sessions are connected.

Whenever one or more players are added to a session, a snapshot of the world's state called a Checkpoint is created by each client and swapped with each other. This contains information such as resources, wrecks, and existing units under the control of the player. Once both clients have accepted and merged each other's Checkpoints, the simulation will match on both client's machines.

This is a very simple and powerful architecture which creates a seamless world from the player's perspective. They can travel as far as they like, and when they encounter another player, by the time their units are in view of each other they will have already been merged. When they leave range, it is a simple matter of dropping that player from the shared session and freeing up the memory that previously stored its units and world data.

Market #1: Game Development

The technology was designed with game development in mind from the beginning. Scripting is an integral component in the development of almost many modern games, allowing designers to create content without needing advanced programming experience.

Market #2: Business

Many businesses rely upon ancient technology in order to function. We've all heard tales of the big company that still has a set of aging servers chugging away because critical logic is run on a FORTRAN-based system and the cost of maintaining it is far less than the cost of rewriting it in a modern framework.

By utilizing the modifiable language grammar, it is possible to mirror the functionality of other programming languages. A FORTRAN language grammar could be implemented in a matter of minutes, and the interpreter then modified as needed to match the language's behavior. The business's existing FORTRAN codebase could then be run on the engine without any modification necessary, allowing them to take advantage of modern hardware and software and interface with modern environments in a vastly simplified manner.

Market #3: User Generated Content Solution for Games

User generated content is an important feature in many modern games, with some titles even making it their central focus, such as Sony's successful LittleBigPlanet series. The technology of the present application can support even more powerful user experiences by allowing players to create, modify, and share scripts. Due to the technology's implicit sandboxing of scripts and the flexibility of controlling what data from the host client is exposed to the script engine, security and usability can be maintained on end user platforms. Greatly simplified syntaxes can be utilized in order to make scripting more appealing to nontechnical users without compromising functionality.

Endgame is one example of how user-generated content can function in unprecedented ways. Every unit is created in script, and these scripts be fully extended and modified by users in any way they wish—from simply changing the health of a unit to creating entirely new units. Because these mods function identically on every platform, cross-platform multiplayer is not limited in any way. A player can create a mod, host a custom lobby with that mod enabled, and the client will send his mod over the network to every other player that joins his lobby, resulting in a synchronized experience—and many of these steps can happen on end user hardware such as consoles and phones.

Market #4: Research and Development

In the field of mathematics, first-class support for arbitrary precision numbers is often desired. While the technology has not been designed with extreme low level performance as its primary goal, it may nevertheless be attractive due to its other strengths, such as the ability to quickly and easily add additional value types and control how they interact with other values in nested mathematical operations. Cross platform compatibility and full suspend/resume support may also be enticing for the ability to time-slice long, complex calculations on a variety of hardware.

The present application further includes a fully interpreted scripting engine, featuring a bottom-up parser that is driven entirely by arbitrary EBNF grammar descriptions at runtime, a language-agnostic stack, and a decoupled memory model allowing for arbitrary implementations across varying platforms. It has been designed with bare-minimum reliance upon specialized language features so that it may be easily ported to other platforms as needed. It is currently implemented in C#, and meets the C# Portable Library specification.

Scripting is important in many technological fields, and especially so in game development, where level designers or game balancers need powerful tools to tweak the game's behavior without requiring deep programming knowledge or being hindered by a long edit/compile/test cycle.

Components are to be fully interpreted at runtime, with little or no reliance on third party toolchains or dependencies upon closed technology stacks. In contrast, many modern scripting solutions for a respective implementation's language, C#, rely upon reflection, which make scripts difficult to port to other languages and platforms.

A scripting engine allows users to write a script once and have it execute the same way on any platform that an interpreter has been developed for. For example, UI definition and logic could be created entirely in script and interpreted and executed at runtime, resulting in the same UI on, say, a phone, an Xbox, and a Linux machine. With high enough performance and enough functionality, even game logic can be scripted. That way, porting the entire game to a new platform would be dramatically simplified, as the script engine would need to be ported instead of the entirety of the game's logic.

Therefore, the specific requirements for the scripting language are somewhat broad: Able to easily interface with the host language to pass memory back and forth and call functions from either side. As flexible and platform-independent as possible. Existing scripting solutions have one or more flaws that made them impractical for these purposes. Most usually, it was the fact that they required either a specialized implementation of their stack being available on the desired platform. Many of the existing scripting solutions specific to C# are heavily reliant on reflection, which is unavailable some platforms. And that is to say nothing of needing to conform to their own syntax and language idiosyncrasies.

The present application provides a scripting engine that is available on any platform, easily rewritten to support a new platform if it was not supported out of the box, not dependent upon unmanaged code, efficient enough to hold up to the demands of real time games running on limited hardware, and offers complete, natural control over a script's execution and its interaction with the host language.

The scripting solution of the present application follows the same path, and is divided into a few components: Grammar definition (defines the syntax of the scripting language); Grammar parser (parses that definition to create a new parser that can read that scripting language); Script parser (parses code using that parser); and Opcode generator (creates a series of instructions from that parsed script); Interpreter (executes those instructions in a virtual machine, and provides access between the interpreter and the host).

The goal of the grammar parser is to take the grammar definition, as described above, and turn it into a set of rules in memory that can be checked at runtime against token streams to determine if they match or not.

Most simple parsers hardcode this step, directly processing the stream of tokens with a finite state machine to validate input. The advantage of doing so is that it is simpler to create and easier to debug. The disadvantage is that this parsing code can be rewritten along with the script engine's implementation, and modifying the script language's syntax becomes an increasingly difficult task as the language grows more complex.

By performing this step at runtime instead, it becomes easier to port script language(s). Only the EBNF parser can be ported once, which can then be reused for every other script language, instead of needing to port each language's parser. Likewise, modifying a script language's syntax is a trivial matter of adjusting the EBNF rules, without even needing to touch the engine code itself.

At a high level, the parser's job is to create a series of Expressions. Each Expression represents a simplification rule, and may contain arbitrary sequences of references to other Expressions or built-in data types to handle grouping, alternation, repetition, or direct testing against literals.

Each Expression object contains:
A byte representing what type it is. For EBNF, that includes options, groupings, repetitions, alternations, literals and identifiers.
A list of Expressions, in case this rule contains sub-elements.
The raw string representing its input. This is useful for representing a literal's raw character data, or determining which rule this Expression references.

Due to recursion, this is a very simple yet highly powerful system. How it works in practice will become much clearer with a concrete example:
letter="A"|"B"|"C" . . . ;
digit="0"|"1"|"2" . . . ;
literal=letter, [{letter|digit}];
Parsing the first two lines each result in an Expression that contains a series of inner Expressions that alternate between a literal ("A", "B" and so on) and a special value indicating the Expression is an alternation:

The latter will do the same, but one level deeper: Expression={Literal="literal", InnerExpressions={"letter, OPTION={REPETITION={"letter|digit"}}}}

Once the list of Expression trees are constructed, they can be used to test sequences of tokens to determine whether they match the Expression.

Parsing the EBNF grammar description is fairly straightforward, and is done with a traditional finite state machine. In pseudocode:

```
clean input by converting all newlines and carriage returns to whitespace
create a list of strings to hold the individual rules
create a string to hold the current rule as it is being assembled
create two boolean to store whether we are in a quote (" or ') or not
foreach character in input
    if the current character is whitespace and we are not in some type of
quote, skip to the next character
        add character to the current string
        if we are a quote, set the appropriate quote flag and continue
        if we are a terminator
            add the current string to the list of rules
            clear the current string
        if we are still in a quote or the last character was not a terminator
            the supplied grammar has a syntax error, return an error
```

Processing is then done on each Rule to properly store nested structures. Anything within brackets can be reduced to a single Expression, and stored in the parent Expression as described earlier. In pseudocode:

```
function Recurse(ref ListOfExpressions)
    create a new list of expressions to store any that are condensed
    set a 'depth' number to zero
    foreach expression in ListOfExpressions
        if expression contains inner expressions
            Recurse(expression's inner expressions)
        else
            if expression is an open parameter (eg, '(')
                increment depth
            if expression is a close parameter (eg, ')')
                decrement depth
            if depth is more than zero
                add expression to condensed expression list
            if expression is more than zero
                create a new expression
            set this expression's content to the condensed list
            remove the condensed expressions from ListOfExpressions
            insert the new expression into ListOfExpressions at the position
    that the prior were removed from
        Recurse(ListOfExpressions)
```

Since a scripting language's syntax is unlikely to change frequently during production use, it is possible to save the parser's output, generally organized into a dictionary mapping of <rule name as string, Expression object>, into a binary format by serializing each Expression object.

With regard to the script parser of the present application, a goal is to take the raw character input of a user-supplied script, and parse it into a bottom-up tree using the supplied grammar definition created in the two prior steps. This prepares the user supplied script for the opcode generator, which will generate instructions for VM-based on this tree. The reason for using a bottom-up tree as opposed to a flat list is that it dramatically simplifies the debugging process compared to the techniques commonly used in similar parsers which generally couple opcode generation with lexical analysis. Additionally, a bottom up tree is a very natural and easy to visualize system for the grammar parser.

The bottom up tree is comprised of a series of Tokens. Each Token is a recursive data structure not dissimilar in concept from the Expression type described earlier; it contains a string containing either the name of its equivalent rule or its literal data, and an optional sequence of Tokens which will make up itself if it is not a raw literal.

Additionally, the script is preprocessed to strip out unnecessary whitespace and comments. This is a custom step that can be changed if the EBNF description uses whitespace as part of its syntax, for example.

whitespace={' '};
letter="A"|"B"|"C" . . . ;
digit="0"|"1"|"2" . . . ;
literal=letter, [{letter|digit} ];
number={digit};
assignment=literal, [whitespace], '=', [whitespace], literal-|number;

With this script to be parsed:
foo=10

The parsed token stream, viewed after each pass, beginning with no passes applied: First pass:
'f', 'o', 'o', whitespace, '=', whitespace, '1', '0'
Second pass:
letter, letter, letter, whitespace, '=', whitespace, '1', '0'
Third pass:
letter, letter, letter, whitespace, '=', whitespace, digit, digit
Fourth pass:
literal, whitespace, '=', whitespace, digit, digit
Fifth pass:
literal, whitespace, '=', whitespace, number
Sixth pass:
assignment When parsing is finished, a single root node Token is provided at the lowest level of detail. Any leaf of the tree may be examined, and in turn that leafs leaves, to recursively view the entirety of the tree representing the parsed script.

In pseudocode, parsing a user script into a bottom up tree is accomplished as follows:

```
sanitize raw string input by normalizing all whitespace characters
create a new list of Tokens
foreach character in string
    create a new Token containing that character literal
foreach rule in grammar definition rules
    while there has been one or more reductions from this rule
        attempt to reduce the token stream with the current rule
        if there was a reduction
            start from the first rule
```

Reduction is performed via a modified, handwritten LALR parser:

```
create a new current list of tokens
create a new Final list of tokens
for each Token in the present stream
    attempt to reduce this Token, and replace it with the reduced results if successful; note if there was a successful Reduction
        add this token to the Current list
        if the Current list contains more than one element, attempt to reduce it
            if the result is a full match
                record the position in the stream
            if the result is a partial match
                continue without doing anything
            if the result is a negative match
                remove the current token from the Current list
                if there was a full match recorded
                    perform that reduction now and note it
                    add the now-reduced contents of the Current list to the Final list
                    clear the Current list
                    add the current token to the Current list and continue
        if there is a full match recorded
            perform that reduction
            add the results of the reduction to the Current list
            append the current list to the Final list
            goto the start of this method
        otherwise, if there the Current list is greater than zero
            append the Current list to the Final list
            if there was a reduction noted
                goto the start of this method
```

Because the parser works on one rule at a time, top to bottom, the sequence of rules defined in the grammar is important to ensure valid output.

The virtual machine interprets the script and produce useful output. It works by processing a series of commands called Instructions, each of which modify the state of the virtual machine in some way. For example, one instruction may create a variable in memory, while the next might assign it a value, and another might call a hosted function based on that value.

A high priority of the interpreter is portability. Therefore, no language-specific features such as reflection are relied upon. Instead, the Instruction is a simple recursive structure, following a similar pattern as Tokens and Expressions. Each Instruction optionally contains any inner Instructions it has, and its instruction-specific implementation details. The virtual machine operates by executing a series of instructions, one at a time.

Linking opcodes is a simple matter of supplying a valid function and the name of the grammar rule that it should be linked to. After a list of these mappings is defined, it is a trivial matter to recursively iterate through the bottom up tree and create an equivalent bottom up tree of Instructions. If a given leaf of the bottom up tree has no linked opcode, a blank Instruction is generated which simply falls through and executes its leaves. This way, the highest level of detail can be filled out, while the finer levels may be inferred automatically—for example, in the case of an Instruction which takes a parameter, instead of needing to create separate paths for each possible parameter type (string, integer, variable, etc.), the Instruction may simply fall through, execute the higher type of Parameter's Instruction, which in turn executes its specific implementation details for readying the value of the proper type and returns it to the caller. As this creates a small amount of overhead, it is possible to optimize this step away by performing another pass and removing many empty instances.

All programming languages, in their basest form, are merely a tool to act upon memory: reading, storing, or modifying values. The interpreter is what runs the instructions and manages the memory that they act upon. This introduces the concept of Values. A Value represents a variable, or 'value' in the virtual machine's memory; it can be anything or any type. Like an Instruction, it is a base class which is inherited from to add specific implementation details for things like integers, floating point numbers, strings, or even data structures such as tables. When created, every Value is given a unique identifier, and a reference to the object is stored in a dictionary with that ID as the key—creating a logical system of pointers to Values in memory, and ensuring that the script engine's state can be suspended and resumed without needing to rely upon the host language's memory remaining intact.

It is important to note that the script engine's memory is a separate concept from the host language's memory: the script engine can see memory that the host language exposes to it. To illustrate this, in one early iteration of the scripting language, a block of bytes was allocated and had each Value store their data in it in their own binary format, creating a virtualized chunk of script memory. For performance reasons, this was removed in favor of having each Value directly store their data as an accompanying field, but demonstrates the power and flexibility of managing one's own memory system.

Each Instruction may optionally return a Value when it is executed. This is a very important component of the execution's design: it is a form of tail recursion which allows arbitrary data to be passed between Instructions as they are executed.

The following example demonstrates this.
whitespace={' '};
letter="A"|"B"|"C" . . . ;
digit="0"|"1"|"2" . . . ;
literal=letter, [{letter|digit}];
number={digit};
assignment=literal, [whitespace], '=', [whitespace], literal-|number;
  Opcodes:
number, GetNumericalConstant
literal, GetOrCreateVariable
assignment, PerformAssignment
  Code to parse:
foo=10
  Pseudocode for each opcode:

```
Value GetNumericalConstant( )
    loop through the inner instructions to assemble a valid number
    check if this number is already a constant in memory
    if so
        return its reference
    else
        create it and add it to the constants table, then return it
Value GetOrCreateVariable( )
    loop through the inner instructions to assemble the variable name
    check if this variable exists
    if so
        return it
    else
        create it, add it to the variable list, and return it
Value PerformAssignment( )
    loop through the inner instructions to determine the left side and the
right side of the assignment
    if Left does not exist
        check the type of Right and create a new value of the same type
        assign Right to Left by copying the contents of its data
        return Left
```

In the case of the supplied script, the Instruction tree will look like this:
PerformAssignment
GetNumericalConstant, GetOrCreateVariable Executing these instructions can be a trivial matter of recursively looping through the Instruction tree and executing each in turn. This adds a negligible performance overhead, and can be optimized out by further parsing the bottom up tree into a flat list of Instructions before execution. Furthermore, the final list of Instructions may be serialized into a binary format to be stored as bytecode and executed later, bypassing the prior compiling steps entirely. This is useful from both a performance and a security standpoint, and is ideal for production use.

The preceding sections describe the design of the script engine, many of which are generalized so that any type of programming language can be created by simply changing the implementation steps of the opcode generator and interpreter. Everything after this point is specific to the scripting language that was developed along with these tools, and presents just one way of accomplishing these goals.

Object-oriented programming is fully supported in script via the use of tables. A Table is treated as just another type of value, like a string or a floating point number, but contains a list of Values and a dictionary of strings to integers. Tables can be used as lists or arrays by simply adding Values to them, or they can be used as traditional classes by naming a Value, or any combination thereof. When a Value is added to a Table with a name, it is added to the dictionary with the name as the dictionary's key and the index of the Value in the list as the dictionary's value. That way, a known value can be easily and efficiently retrieved from a Table by its name.

As more variables are declared in script, it is important to be able to unambiguously refer to them via lexical scoping rules. If a script declares a variable named X inside a function, and another variable named X in another function, they should not refer to the very same place in memory.

The script engine maintains a scope stack which is simply a stack of a dictionary of the identifiers and positions in memory of Values. Whenever an Instruction creates a Value, the top level of the stack is peeked and the Value added to it. Instructions may push or pop the stack to define scope. For example, a FunctionCall Instruction will push a new dictionary to the stack before executing its body, and pop it once completed.

This allows for a further improvement to a GetIdentifier function: iterate through the stack, starting from the top level, and return the first Value found which matches the identifier name. This neatly handles lexical scoping at any level of depth, and retains the highest level of efficiency when interacting with variables local to the current scope as the top level is always searched first.

Note that each scope state level is equivalent to a Table, and is stored as such. This makes it quite natural to import another script as the contents of a table, and is accomplished by merely pushing a new Table to the scope stack, running the script, and returning the Table's now-filled contents.

If Instructions were allowed to allocate memory indefinitely, any real-time scripting application would eventually run out of memory. To prevent this, there can be some method of freeing Values that are no longer needed, but how do know which ones they are? For example, a user define a variable inside of a function, but once it has served its purpose, will never be touched again.

In some programming languages, memory is unmanaged, with the programmer being responsible for freeing variables which will no longer be used. This is much simpler to implement: define a FreeVariable function, which searches for an identifier and frees the first instance of it that it finds. This is easy to implement, but shifts responsibility to the scripter to find and plug memory leaks themselves.

Many modern languages are managed, which automate this process by detecting when variables fall out of scope and freeing them. This is much easier to work with for the scripter, but extreme care can be taken in the script engine to ensure that unneeded memory is freed and not memory that is still being used! As ease of use is a high priority for my scripting language, this route was chosen despite the additional complexity it introduces.

Reference counting is used to determine which variables are eligible for reclamation. Each Value has a References integer which is incremented by any Instruction that begins using it, and decremented whenever they decide they are done with it. To see how this works in practice, consider the FunctionCall Instruction again: the parameters to the function will be declared as local variables in its scope and referenced, and after the body of its instructions are executed, those parameters will be dereferenced and its scope will be popped.

Whenever scope is popped from the stack, each variable that was attached to it is dereferenced once and checked if their references are less than or equal to zero. If that is the case, they are removed from memory, and their id is returned to the pool.

Being able to step through a script's execution is important for usability. In fact, this was one of the primary reasons that drove the decision to create this system, as most scripting languages have limited and awkward debugging support. This is not surprising as it requires two complex features: knowing which part of the original source each Instruction came from, and the ability to pause and resume execution of Instructions.

Scripts start out identical as the raw text that the scripter edits: the source code. But the script parser changes that source—two primary examples being the removal of extra whitespace (as the EBNF description does not rely upon whitespace for anything other than to aid the separation of statements, unlike other languages such as Python which use whitespace as part of their syntax) and removing comments. Therefore, by the time the script is compiled into a set of instructions, the position of the token that it came from will be different from the source file.

To illustrate this problem, observe the following script:

X=0
Look at me, I'm a comment! Wooo
X+=1
I'm another comment! Yaaay
X+=1

When the script parser tokenizes that script, it will be transformed to:

X=0
X+=1
X+=1

If a user wants to set a breakpoint at line one, both versions match and there's no problem. But after line two, they begin to diverge. If a breakpoint is set at line three in a source code, X would be considered to have a value of 0 and would be being incremented to 1. But the script will think that it's already at 1 and being incremented to 2! And if a breakpoint is set at line five, it'll be at an invalid location.

To solve this, two dictionaries are created during the preprocessing step: character location to line index, and processed script character location to original script character location.

The first dictionary is simple to create:

foreach character in source
  if character is a newline
  increment line index
  add the current line index to the dictionary with the current character index as the key The second dictionary is more complex, as it can account for every modification that is made to the source:

```
compiledIndex = 0
inSingleLineComment = false
inMultiLineComment = false
foreach character in source
    if inSingleLineComment
        if no longer in single line comment
            remove the extent of the single line comment from source
            reset incomment flags
    if not inSingleLineComment and not inMultiLineComment
        if a new comment of either type has begun
            set appropriate incomment flag
            record the character index it begins on
    if not inSingleLineComment and not inMultiLineComment
        compiledIndex++
        add <character index, compiled index> to dictionary
    if inMultiLineComment
        check if comment has terminated
        remove chunk from source
        reset incomment flags
lastindex = -1
foreach character in source
    try and set lastindex to the dictionary's value at character index
    if dictionary does not contain this character's index
        set it to lastindex
```

By splitting it into two passes, any commented out chunks of source can be filled with the last character position before the removed chunk began. Converting between compiled and original source character locations can now be accomplished with simple and efficient dictionary lookups.

Programmers often write code procedurally—expecting that each line of code is executed one after the other. Even with the rise in popularity and ease of use of asynchronous programming patterns and language features, the ability to pause and resume execution of a program at any point during its execution is a feature that remains largely elusive. Imagine trying to write a function with the expectation that, at any point of its execution, its state would need to be saved, control returned to some other part of the program, and later seamlessly resumed from the point left off—and now imagine trying to write an entire program with the same expectation.

The complexity of this feature is mirrored in the higher level concepts that spawn from it. Consider a game with a series of checkpoints. The game's state may be resumed from one of those checkpoints, dramatically simplifying the amount of information that can be saved and later resumed. Instead of needing to save the player's current animation state, the status of many enemies that are nearby it, and an unfathomable number of other pieces of data about the game, it merely needs to store the stats of the player and what checkpoint to return them to the next time the game is loaded.

The majority of applications solve this problem by limiting their suspend/resume cycle to clearly defined entrance and exit points such as the checkpoints in the prior example. For example, in a traditional application such as a word processor, its state may be suspended and resumed at any time by merely storing the contents of the text file and the position of the caret. It's the same principle as in the game with checkpoints, merely with a much less complex implementation due to its vastly simplified nature.

In both cases, the concept of suspending and resuming execution is still something of a misnomer. Applications do not normally perfectly suspend and resume execution of instructions from any point in their execution—merely from those clearly defined entrance and exit points. In the word processor, the decision of whether to suspend or not is simply checked once per update cycle. In the game, it's every time the player passes a checkpoint.

In the scripting engine of the present application, true suspend and resume functionality is supported at the Instruction level. In order to save the state of a text editor written in script, the current memory object and the current list of instructions can be stored. Putting them back in place later on will result in the script's execution seamlessly resuming.

Furthermore, every time an Instruction is run, it will check for an interrupt signal. This could be from a timer, such as to give the script a chunk of time to work with before returning control elsewhere, or if a debugger is attached, it might indicate that a breakpoint has been met and execution should be paused for inspection by the user. Due to the implicit support of tail recursion by the instruction execution model, it is relatively simple to bubble up the interrupt signal, storing the current execution state of every Instruction on the stack as it goes.

Each Instruction performs this check before it runs, thus making the resumption of its state trivial as no processing has been done yet. In the case of more complex functions such as function calls and loops, this check is performed at each interval of an Instruction being run in its body, with logic added to suspend and resume the Instruction's state. For example, in a function for a for loop, references to the destination and iterator variables would be stored.

This model not only makes perfectly suspending and resuming the script's state a trivial matter, but makes instruction-level debugging and single-threaded time slicing of script execution possible.

Virtually every feature described in this paper has been implemented as runtime data types, and everything is treated as a first-class value. For example, functions are merely a value type like a table or a floating point number. Scripts can pass around functions just as they would any other variable. Scripts themselves can be treated as variables in script, thanks to the ease of scoping: a new script can be compiled and run, and return its base scope stack as a Table, which is now filled with many of the variables and functions that that script may have created.

Languages which natively support code-as-data in this manner help provide more natural ways of solving common programming tasks. For example, for an RPG that had items that affected the player's stats, instead of needing extensive amounts of boilerplate code in order to explicitly define interfaces between classes and how they can affect the player's fields, each item can simply store a function that carries out the desired effects on the player's fields which can then be passed anywhere it is needed. Functions could even be sent over a network and shared between players if desired.

Tasklets are a type of green thread that are scheduled by the virtual machine. A Tasklet has two main usage scenarios: asynchronously executing a long-running script little by little without stalling, and performing recurring actions at a set interval. A Tasklet is little more than a script Function with some information about how it is to be used. At an interval set by the user, the Tasklet manager is given a set amount of time it may use to execute its Tasklets. Each Tasklet is given a portion of that time, and its execution is resumed from wherever it last left off. When its scheduled time has elapsed, it is interrupted and suspended again.

Debugging tools of the present application are developed in script, with the eventual goal to implement a script compiler in script, thus making the language self-hosting. At present, a fully functional text editor has been created in script, in addition to an interactive debugger and a script memory viewer. The primary advantage of creating these tools in script is that they can then be just as portable as scripts themselves—no matter what platform they go to, debugging tools will always be readily available.

There are several key advantages that this scripting engine provides, including: Portability of engine: the compiler, runtime, and tools are all written with strict avoidance of platform-specific features, including unmanaged/unsafe code, pointers, reflection, DLLs, etc. It meets the C# Portable Library specification. Runtime modification of language grammar definition, allowing arbitrary changes to syntax without a recompilation step and without needing to interpret code that is emitted at runtime. It natively parses EBNF grammar descriptions and reads files formatted with the described syntax. Everything is first-class, everything is data design philosophy. Functions, bytecode, tables, etc. can be easily passed back and forth between script and the host language, and treated as variables themselves within script, enabling functional programming design paradigms and maximizing interoperability between the layers. Scopes are treated as Tables in script, allowing scripts to easily view what memory they currently have access to at what scope, dramatically simplifying loading other Scripts as libraries, and enabling transparent inspection by the host language. Many of these types can be serialized to a binary form and restored because they're simple data types. Implicit suspend/resume support of runtime state in a binary format. Simply write the contents of the script's memory buffer and the current Instruction stack, and a complete representation of the VM's state is provided that can later be restored later to seamlessly resume execution. This can be performed at any time during execution, even while running a deeply nested chain of user functions. Self-hosted debugging tools and a fully integrated debugger. The debugger is built into the scripting engine, and can simply be toggled on or off depending upon need and availability of debug symbols. Debugging of end user scripts can be prevented by not saving debug symbols when compiling to bytecode. Core debug functionality (break/step/resume) is fully integrated into the engine, without needing a 3rd party library to be managed or hooked. The debugger's visual interfaces are written in script, maximizing their portability—ensuring that users are never without easy access to a feature rich debugger.

Development tools are designed to aid in development and debugging of scripts. They are broken up into three separate components: The IDE provides a robust and efficient text editor, as well as an interface to view and control the script's execution state via the traditional debugging features of pause/step/resume and setting breakpoints. The Interpreter provides a read and write capable console, which can be used not only for text logging, but the input and evaluation of script statements. The Memory Viewer provides a recursive, collapsible tree view of the current scope stack. This viewer is generalized, and can display any arbitrary scope or script Table type value. Each of these tools are written entirely in script. Serving as a template as to how well-designed scripts should be designed, they require minimal host code, which is primarily used to hook input functions and text drawing functions. This means that the development tools' are just as portable as any other scripts that are written: any platform which can support script execution will natively support the development tools as well.

Logic can be kept within script. Host code is reduced to the bare essentials: providing interfaces for scripts to access input devices and rendering services. Script-related code written in the host language is kept to the absolute minimum necessary, maximizing portability.

Development tool script is run by calling their Update and Draw functions. This is standardized, so as to reduce the amount of knowledge of how each script functions internally. Note that this could be examined at runtime by iterating over values in the base level variable scope stack once the script is first run, and observed from the names of function values contained within. Because the scripting engine provides such power and flexibility, sticking to self-enforced coding best practices such as the described interface design plan becomes even more prudent in order to maximize development efficiency.

Furthermore, each development tool script is expected to be drawn inside an arbitrary rectangle, which can be changed at any time. This means that each development tool can be integrated into a greater GUI regardless of platform or design—the tools can easily be dragged and resized around, or tabbed, or toggled on and off as desired, or otherwise displayed in any other way the developer desires.

For even greater convenience, self-contained classes are provided which handle the instantiation of, function hooking, updating, and drawing the script(s) for each development tool. They also serve as examples of best practices for scripting: a well-defined update and draw mechanism and minimal host code.

FIG. 3 illustrates an example integrated development environment ("IDE") that contains modern text editor functionality. A text file is loaded as a list of strings, one per newline separator char. Text wrapping is fully supported, with a robust, efficient mechanism for automatically wrapping text to multiple lines, while acting upon that which is currently in view for efficiency. As with any modern text editor, text wrapping only changes how the text is visually displayed, not its underlying representation until dictated by the user. It may also be toggled on and off at any time. Line numbers are optionally displayed as well and are taken into account during text wrapping.

The underlying text lines are stored as a table of string values. Wrapped text ready for display is stored as a table of sub-tables, each containing a table of text lines, and the current location on the screen. This makes it simple to test a line of text's position against a mouse cursor or touch-screen location.

A table of numeric values indicating highlighted sections of text is also maintained, and is tested against when drawing text. With this feature, breakpoints in a script can be displayed in the editor with three lines of host code: every frame, calling ClearHightlights on the text editor, looping through the desired Script object's Breakpoints collection, and calling SetHighlight on the text editor for every location in the collection.

FIG. 4 illustrates an example display screen representing debugging capability in accordance with an example implementation of the present application. Pausing and stepping through execution of a script is visually displayed by highlighting the currently executing line in a different color. An event is raised by the script that is being debugged every time execution focus is changed, which is the perfect place to call HighlightLine and GoToLine on the editor script, mirroring the expected functionality of familiar debuggers.

Figure 5:
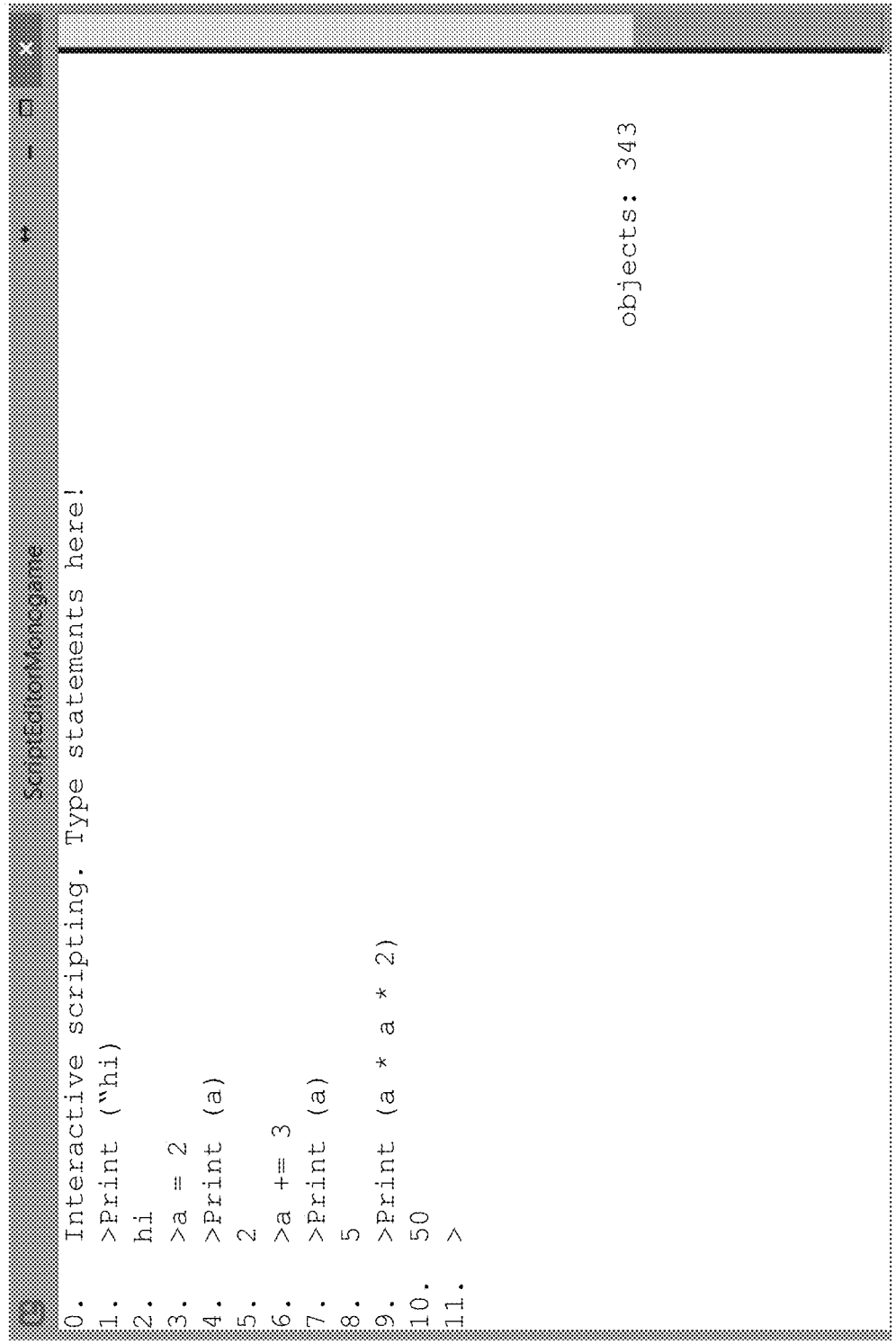
FIG. 5 illustrates an example display screen representing an interpreter in accordance with an example implementation of the present application.

FIG. 5 illustrates an example display screen representing an interpreter in accordance with an example implementation of the present application. The interpreter is closely related to the text editor and shares the majority of its script. It is restricted to allow the user text entry on the last line, when a text input prompt is active, and contains helper functions for formatting and printing lines of arbitrary text. This means it can double as both a console, such as for logging debug messages during development, and directly inputting commands.

Whenever a new line of text is entered, it is interpreted by the targeted script. This means that it is simple to manipulate scripts that are running, such as to set variables or to call functions. It can be used to include the same functionality as seen in many games and applications that include a console, which generally allows the player to enable debug modes or cheats. With this system, it is trivial to access and manipulate running scripts by directly interpreting commands entered by the user, and does not require the developer to write a custom parser themselves in order to process commands that the player may enter.

Figure 6:
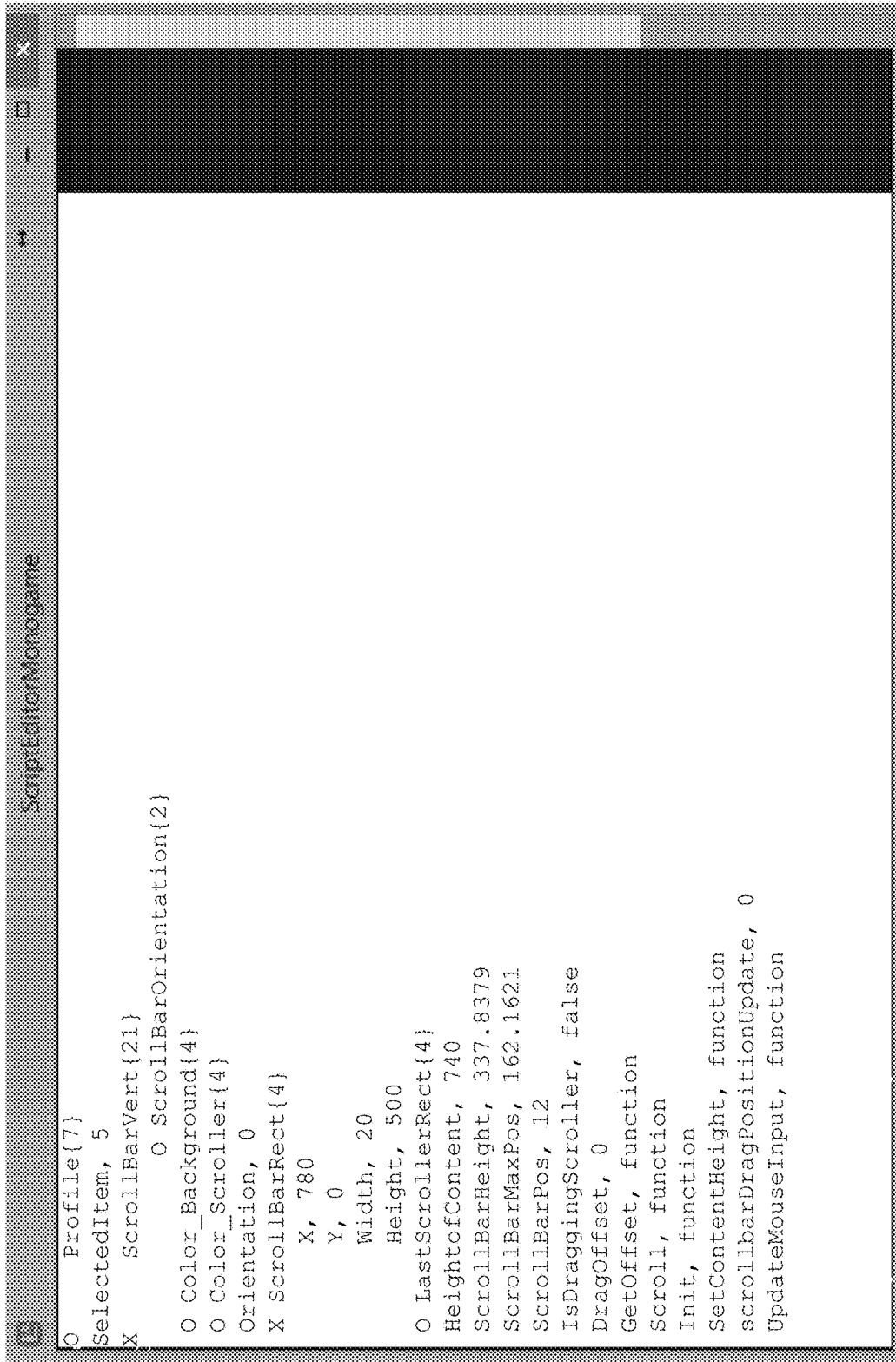
FIG. 6 illustrates an example display screen representing a memory viewer in accordance with an example implementation of the present application.

FIG. 6 illustrates an example display screen representing a memory viewer in accordance with an example implementation of the present application. The memory viewer can display a recursive tree view of a table value's contents. As script scope stacks are stored as table values, this means that it can conveniently be used to explore a script's memory.

In one or more implementations, a tree view (not shown) can be provided and illustrates a list of currently drawn entries, similar to the text editor's wrapped text, which are then tested for collision against a mouse cursor or a touch-screen location. A tree view node can be expanded or collapsed by clicking on it, allowing the entire memory structure to be examined as desired.

FIG. 7 illustrates an example script integrated development environment in the context of a running script. In FIG. 7, a memory viewer is visible in the bottom left quadrant of the screen.

The technology set forth in the present application does not necessarily rely upon a fixed language syntax definition, as its grammar parser is built at runtime and controlled via a variant of the Extended Backus-Naur Form description. This means that the language's syntax can be arbitrarily defined at runtime, without needing source code access or to recompile.

The syntax changes can be as large or as small as desired, ranging from changing the name of a single keyword, to dramatically altering how program flow is defined and controlled. Any type of language definition is possible with the versatility of the EBNF. Due to the popularity of the format, many other programming languages describe their syntax in it, which can be used with minor changes in order to dramatically reduce the time needed to incorporate features from them.

To mirror functionality of another programming language, changes to the script engine's runtime may be necessary. This would currently require recompilation after the changes are made. However, there are two potential further developments which may address this issue. The first is to simply build up a library of instructions that are common to many programming languages, and picking and choosing which ones are included in a language's definition based upon its need. To some extent, this is already implemented. The second option is to re-implement the scripting engine in script—thus making it self-hosting, and giving the user complete control over arbitrarily modifying its functions at runtime, without any recompilation necessary.

Introducing DOGECODE:

```
#Print the numbers 1, 2, 3.
such amaze wow arf 1 bork 4 bark
    woof grrr wow yipe
much wow
#Print "wow" if the variable is greater than 100.
treats arf 500
headtilt treats > 100
    woof grrr 'wow' yipe
not headtilt
#Create a power function.
pow arf ball grrr x bork y yipe
    tmp arf x
    such amaze i arf 1 bork y bark
        x arf x * tmp
    much wow
    yip x
pls throw
#Print the output of 2^3, as computed by our function.
woof grrr pow grrr 16 bork 5 yipe yipe
```

For comparison, here is what the same script would look like written in the baseline syntax:

```
#Print the numbers 1, 2, 3.
for wow = 1, 4 do
    print(wow)
next
#Print "wow" if the variable is greater than 100.
treats = 500
if treats > 100
    print('wow')
end if
#Create a power function.
pow = function(x, y)
    tmp = x
    for i = 1, y do
        x = x * tmp
    next
    return x
end function
#Print the output of 2^3, as computed by our function.
print(pow(16, 5))
```

DOGECODE makes the language less readable by replacing common programming terminology with dog-related words. It was created in approximately ten minutes, and not a single recompilation was necessary during its development.

This was accomplished by editing the EBNF control file. The full file is omitted for brevity, as the important changes are quite succinct:
return='yip';
func="ball";
endfunc='not', [whitespace], func;
endfunc2='pls throw';
if ='headtilt';
next='much wow';
endif='not', [whitespace], if;
eq='arf';
sep='bork';
paren=openparen, [whitespace], expression, [whitespace], closeparen;
function=func, [whitespace], funcparam|paren, [whitespace], [{[whitespace], statement, [whitespace]}], [whitespace], [funcreturn], [whitespace], endfunc|endfunc2;
functioncall=identifier, funcparam|paren;
forloop='such amaze', [whitespace], assignment, [whitespace], sep, [whitespace], parameter, [whitespace], ['bark'], [whitespace], [{statement, [whitespace]}], endfunc2|next;
assignment=[(local, [whitespace])], identifier, [whitespace], eq, [whitespace], identifier|string|number|expression|table-|function|functioncall|bool;

Creating a new parser based upon a new or modified EBNF file can be done in one line of code. Many future scripts will be parsed with the grammar that created from it:
string EBNF=File.ReadAllText("DOGECODE.EBNF.txt");
scriptEngine.Compiler.EBNFParser=new EBNF_Parser (EBNF);

The scripting engine's instructions are generic by design, aimed at implementing common features shared among many programming languages. As many language features such as garbage collection, value and reference types, and variable scoping are robustly implemented, it is quite easy to simply modify existing Instructions to function as needed in the language being defined.

For example, the Assignment instruction takes two instructions—the instruction on the left, and the instruction on the right. The instruction on the right is executed and assigned to the left instruction. This matches the expectation of what Assignment statements in most languages look like: Variable="Hello, world!"

The Assignment instruction's Preprocess method is straightforward, looking through the Instruction's children, contained in the innerinstructions array at the expected locations. The first Identifier found in the array is assumed to be the left instruction, with an optional Local instruction preceding it. The right instruction is always the last item in the array.

```
public override void Preprocess( )
{
    foreach(Instruction i in innerInstructions)
    {
        If(i.original.EquivelentOrSuperiorTo("local"))
        {
            isLocal = true;
        }
        else if(i.original.EquivelentOrSuperiorTo("identifier"))
        {
            leftInstruction = i;
            break;
        }
    }
    rightInstruction = innerInstructions[innerInstructions.Count - 1];
}
```

In order to change the syntax of an Assignment instruction, its Preprocess method would be modified. For example, if COBAL's MOVE instruction were implemented, which reverses the order of the expression and the variable:
MOVE expression TO variable The Preprocess method would be even simpler, since there are only two positions in the expression that are valid for the tokens:

```
public override void Preprocess( )
{
    leftInstruction = innerInstructions[3];
    rightInstruction = innerInstructions[1];
}
```

In the current implementation, determination of whether a variable is of value or reference type is performed by the GetIdentifier Instruction, allowing for prefixes to force one type or the other as the user desires, and which can be omitted to let the compiler assume that many Tables are manipulated by reference while many other types are manipulated by value. These rules can be changed if desired by the language designer, either by modifying the manner in which a value or reference type is identified, or even moving that logic into the Assignment instruction. The building blocks are there—they are limited only by the imagination and patience of the designer.

In one or more implementations, a static version of the scripting engine and language and/or a self-hosting version of the scripting engine is used in order to implement a preprocessing step in script instead of in host code, potentially even expanding the EBNF grammar to allow it to be expressed directly within EBNF control files. This allows even finer control over the creation of new language grammars with even less need to rebuild/recompile/restart during development.

As more languages are supported, their Instructions can remain in the same codebase, accessible by every instance of the script engine. As each Instruction is represented as a self-contained class in the host language, the tiniest fraction of overhead in the form of binary size is required to keep them.

This means that the script engine can have the ability to freely switch between grammar syntaxes. Two Script objects could be created, each with a different grammar and each linking different Instruction sets, and yet exchanging data between them is trivial as the underlying data that they interact with is identical. For example, COBALT and Lua could mix freely, even calling functions from each other and naturally consuming and using their return values. Or any other programming language that is implemented—the possibilities are limited to the time required to implement an EBNF grammar and create or modify an existing instruction set.

The possibilities of runtime syntax are many and varied. Modifying EBNF descriptions takes a fraction of the time that it would take to modify similar functionality in traditional parsers, and the ability to do so at runtime makes integration of disparate languages a possibility. For example, scripts written in DOGECODE are fully compatible with scripts written in the original scripting language—meaning that scripts written for different grammars can natively share memory at runtime.

The difference between 'programming' and 'scripting' in game development can seem arbitrary. In the past, scripting was usually thought of as code executed in a slower and simpler interpreted language, in contrast to traditional programming, where code is compiled ahead of time and executed much more quickly. The distinction became blurred as technology improved, with many interpreted languages proving themselves to be fast and robust enough for serious development.

In modern game development, the term 'scripting' is generally used to identify a set of programming tools and APIs exposed by a game that are intended for use by designers or end users. One primary advantage of this is enabling designers to change the game's balance or mechanics without needing extensive programming knowledge. It is usually much faster, as the project does not need to be recompiled. Perhaps most importantly, it empowers users to create their own mods, driving player retention and greatly extending a title's potential lifetime.

Endgame is an RTS with an enormous scale, with the goal of simulating thousands of units under each player's control in real time. As such, each design choice is carefully made with performance in mind. The engine of the present application focuses on providing first-class tools to enable any type of unit behavior imaginable by the designer, while minimizing performance costs by carefully selecting what behaviors are scripted. Each unit in Endgame is defined by a Script object. Its script contains the information necessary to create and update the unit, including data values such as health, resource references such as models and animations, and logic for advanced, unit-specific features such as missile systems that the player has to click to fire. This ensures that end users have the same access to engine functionality as designers—every unit created for the game is made using the same tools that players can have access to.

In general, low-level implementation details are kept out of script. There are two important reasons for this: clarity and performance. Scripters generally will rarely need access to low-level implementation details of engine features, and ensuring that the APIs they interact with are cleanly abstracted ensures that scripts maintain a high degree of readability. This simultaneously improves performance, as the majority of the heavy lifting is performed in highly optimized engine code.

Almost all units share common functionality, such as having a set amount of health, needing collision detection performed, having that health decrease when a hostile projectile collides with it, and exploding in a giant fireball when their health reaches zero.

This functionality is abstracted away, hidden within the engine and accessible through a robust set of flags that are modified through script. This is an important design choice, as host code will be many times faster at executing performance intensive functions such as collision detection or pathfinding. It also frees the scripter from needing to know the implementation details of the engine, instead freeing them to focus on how they would like the unit to utilize them. The script is merely responsible for passing that information back to the engine.

If units require different health values, their data could be trivially stored in a flat text file. The real allure of a proper scripting engine is the ability to define custom logic. This is accomplished by providing functions that are called in script when certain events are triggered, such as OnCreate, OnDestroy, or OnTick. The engine calls them at the appropriate time, allowing the scripter to create an infinite variety of new functionality that otherwise could not be easily made.

One example of this would be nuclear missile launchers: silos that can store very powerful missiles, but can be manually launched by the player, who most likely would not want the AI to randomly fire such a costly investment at the very first scout that crosses into radar range!

Therefore, missiles and their 'ammo' are created entirely in script. The missile launcher's script provides the logic for attempting to build a warhead if resources are present, and calls the appropriate engine functions to interface with the UI layer to display its current status to the player. It also adds a new UI button to the unit's toolbar, allowing them to fire the missile when it is completed. Doing so can call the appropriate function in script, which can then create the missile object (which is, of course, another script!) and set its target.

Every weapon for every unit is similarly defined in script. From the turret on a humble tank to each anti-air battery on an experimental warship bristling with firepower, every game element is defined in script. Units contain Weapons, which in turn fire Projectiles. Many of which follow the same design principle as Units: low-level, performance-critical behavior is accessible from the engine, while scripting provides a layer for arbitrarily complex customization.

Scripting languages tend to have the reputation of having high overheads. This is especially true of the virtual machine necessary to execute scripts. In Endgame, with thousands of units being built and destroyed, each running their own script, performance is of the utmost importance. While the design choices described in the preceding section go a long way towards achieving this goal, there is always a need for optimizations of the scripts in order to maximize performance. Several key optimizations are made possible with the scripting technology.

Every scripted object is preloaded in a lookup table, with a 'reference' script object of it in its loaded state. When a new object is created, a deep copy is performed on the original script object that is in the master list. The two major components that are copied are the memory table and the list of compiled instructions. This avoids the overhead of re-interpreting script, or even the overhead of loading byte-code. For even greater performance, a pool of script objects can be maintained for objects that there are likely to be many copies of, avoiding the overhead of allocating new objects on the heap or adding to the garbage collector when they are freed.

Empty functions that have no instructions are simply skipped—they are not executed, and never touch the execution stack. For simple units that do not require custom logic, and therefore never override any of the functions the engine calls such as OnTick, this offers a nontrivial performance boost.

Once a unit's functionality has been locked down, it is straightforward to rewrite its logic in host code, bypassing the script engine entirely and further reducing overhead. This may be useful for campaign-only objects, where performance may be even more critical for low-spec platforms. The original script is retained, and may still be modified by the user—should this happen, it seamlessly replaces the now-obsolete hardcoded version. This provides the best of both worlds, with the optimizations made possible in a lower level language being used except in the rare cases where a modification is made, granting the user the additional performance until it is modified.

A key feature of Endgame is its lockstep deterministic simulation. This poses some interesting technical challenges for the engine. The decision was made to utilize 64-bit fixed-point math in place of many floating point operations on the simulation layer. While floating point values can be deterministic if the platforms are using the same IEEE floating point number spec, due to extreme portability being one of the core design goals of Endgame, this requirement was deemed too limiting. By replacing the native floating point value type in script with a fixed 64 bit type for integer math addresses this limitation. In scripting technology of the present application, can effect simple copy and pasting the floating point value type, finding and replacing 'float' with 'Fix64' and adding the requisite conversion boilerplate in it, and editing the script's EBNF description to change the original float types to the new fix64 type. This results in scripts that are natural looking—scripters simply work with what appear to be floating point values in script, letting the underlying engine handle the 64 bit operations for the. The change to the scripting engine is non-destructive, leaving the original floating point value type in place and available if needed, such as for interoperability with other scripts or for the UI layer. Most importantly, it ensures that script output is deterministic across many platforms.

This solution can be applied to a myriad of situations, and is of especial use in scientific fields where arbitrary-precision value types may need to be manipulated. Adding non-destructive, first-class support for new value types, in addition to supporting modifications of existing value types as described above, are simple and effective solutions that are not possible in most other scripting platforms.

Green threads are deterministic as well, as instead of using execution time as the time slicing mechanism, the number of statements executed can be used. As the order in which green threads are scheduled is deterministic, this ensures that changes in hardware and platform will not result in different behavior when the same input is given.

First-class debugging support is provided by the direct integration of the script development tools in Endgame. Scripts can optionally be compiled with built-in error checking enabled, which is the default setting for user-created mods. If an exception is thrown during script execution, instead of crashing the entire game, the affected script is suspended, allowing the user to examine its error message and execution stack to help determine why it crashed.

As the development tools are written in script themselves, this functionality is present across many platforms—be it PC, console, phone or tablet, the same set of tools are fully functional.

Scripts can be stepped through in real time in order to facilitate the debugging process. Due to their implicit support of suspend and resume from any point during instruction execution, and the engine's multi-threaded execution paradigm, deterministic execution can be preserved even in a networked environment. When a unit's script is suspended, the simulation pauses at the last completed tick, waiting for the unit's script to resume and complete before continuing. Any modifications made to the paused script, such as the direct manipulation of its memory, can be trivially synchronized across multiple clients by simply copying the modification made locally and sending them to the other clients to complete. This would enable the possibility of collaborative scripting and debugging, which may be a valuable feature in its own right—imagine a student running into a bug in their code, and a teacher joining a remote debugging session to help them work through the problem!

Furthermore, as units are defined and driven entirely by script, new units can even be created while the game is running, without needing to close and rebuild the project. This is done by using the text editor to create or modify a unit, and then calling an engine function to add it to the master list. It can then be spawned, built, or created from another script like any other unit.

This, too, can be done deterministically in a networked environment. Whenever a script is created or modified, it generates a simulation instruction containing the source script as a payload. When other clients receive this instruction, they simply execute the script. Due to the lockstep deterministic nature of the simulation, so long as these instructions follow the same rules as other command instructions by waiting until the agreed-upon future tick to execute, the result can be identical execution across many clients in the simulation.

This provides a mechanism for real time collaborative development. Designers can make balance changes in real time and then see players test them all without leaving the multiplayer session. Without this technology, testing balance changes would be a time-consuming endeavor, requiring the designer to make the change locally, package the script, send it to many other players, have each player install it locally, relaunch the game, and finally reconnect to a multiplayer session. This would add numerous potential points of failure and multiple minutes each time a script change is needed, compared to instant, real-time technology of the present application.

When a global patch is pushed, it can be sent to each player currently in a network session, with each simulation scheduling the changeover to the new set of scripts on a certain tick in the future. Just like with collaborative modding, this can be done in a deterministic manner, which, therefore, does not require players to stop what they're doing. This is in contrast to the manner in which the majority of online games, especially MMOs, behave, which generally have scheduled server downtime whenever a patch is pushed, forcing players to cease their game sessions and wait until the servers are restarted. In many games, even 'hotfixes' which may not result in server downtime still generally require the player's current game session to finish before they are applied.

Replays of games are stored as each player command input in the session and the timestamp at which it was input. With an identical engine version and set of unit scripts, playing those commands back results in an identical game. This is a highly efficient format, with hours-long games with tens of thousands of units requiring mere kilobytes to faithfully represent. Very few games use this technique, but those that do generally do not provide a built-in mechanism for switching between patch versions.

In the past, watching a replay from one patch and switching to a different patch would necessitate relaunching the game with a different patch applied. With the technology of the present application, this step is unnecessary as the scripts used by the patch can be changed at any time. This allows players to freely browse and watch replays without needing to relaunch the game, and eliminates a common point of failure which would otherwise lead to an inability to watch the replay, or the broken execution of a replay.

The console of the present application is written in script, and provides not only a way to interact with the simulation and engine, but the power of a first-class programming language. Instead of being limited by a hardcoded syntax and limited commands provided by the console, many of the features of the scripting language are freely available to use, such as variable and function declaration, assignment, function calls, and even importing of scripts. Being that it is written in script, it is not limited to functioning on the PC as with other games—it functions identically on virtually every platform.

As noted herein, three separate coordinate systems are used in order to refer to arbitrary-precision coordinates on arbitrary-sized spherical planets in a game environment. This system has been further enhanced to support bidirectional integration with 3rd party coordinate systems, thus allowing objects to fully interact with 3rd party physics objects, and 3rd party physics objects to fully interact with objects of the present application. The interaction is in a manner that appears seamless, despite necessitating a large degree of translation between incompatible coordinate systems. For example, consider the case of wanting to place objects, such as cubes and animated models replete with advanced physics and collision modelling, in a third-party editor and have them seamlessly interact with terrain and objects on Endgame's planets. This is accomplished by automatically translating the object's coordinates to Endgame's coordinate systems at specific times during execution. Furthermore, the object is given a reference to an Endgame coordinate location to act as an origin location. Thus for every frame, each object is translated to Endgame's planetary coordinate system using that origin as the object's new 0,0,0. It can then be processed as part of Endgame's internal physics and simulation before being returned to its original location at the end of the frame, and before rendering, such that the user does not visually see this rapid coordinate switching occurring but the engine is tricked into processing its physics as though it were at the proper location.

Furthermore, Endgame objects can be transformed to third party coordinates using the same system, but with the coordinate transform inverted, thereby transforming objects in Endgame's coordinate system to the third party's coordinate system, allowing them to seamlessly interact with the third party's physics engine. For example, this is done with Endgame's terrain patches, which are converted to the third party's coordinate systems and given the third party's properties, such as specific terrain physics features, thereby allowing the third party to properly handle the physics of its objects bouncing off of Endgame's planetary terrain.

As these coordinate transforms are arbitrary and based around known origin points, they can fully function at arbitrary levels of detail and precision, thus removing the limitations of a third party's 32-bit precision coordinate system. The process is conceptually similar to how the floating camera origin works in Endgame in order to maximize precision where it is most beneficial for rendering.

Thus, the present application operates to import and/or export coordinate matters from or to respective third party platforms. For example, terrain may be created in Endgame and a terrain object can be created and exported to a third-party platform for rendering. Alternatively, objects created in a third-party platform can be imported into Endgame's coordinated system. In addition, since particular stages of various transforms can be controlled, the present application is well-suited for enabling interaction between objects from a variety of locations and platforms. Terrain from one platform (e.g., Endgame) can interact with objects of another platform. The present application eliminates the need constantly manage coordinate space and where the objects come from is not limited by a particular platform.

Further, a third party's camera system can also be compatible with the same process, in either direction: based upon need, either Endgame's camera coordinates can be translated, and the third party's rendering camera overwritten with its data, or the third party's camera coordinates can be transformed to Endgame's coordinate system to be used for occlusion querying.

Endgame utilizes circular queues to perform lockless multi-threading. A circular queue is simply a generic data structure which contains: The queue's size. An array of the supplied object type. The current position in the queue. And a set of methods for interacting with it: Calling a Get( ) method returns the current object, indexed from the array at the current queue position. Calling Push( ) copies the contents of the objects in the array at the current queue position to the next location in the queue, wrapping it if it has reached the end of the queue size, and then increments the queue position by one. Calling Prev( ) decrements a copy of the current queue position by one, wrap it if it reaches 0, and index the object array at that position.

For example, the simulation's dictionary of Units is a prime example of how the circular queue enables highly efficient inter-thread communication. Almost every thread needs access to the Units dictionary, as it is the main repository of the working copies of many of the current units in the game, indexed by their unique identifier: CircularQueue<Dictionary<UnitIdentifier, Unit>>Units;

The main simulation thread is responsible for scheduling many other simulation threads, such as the pathfinding thread. In pseudocode:

```
void SimTick( )
{
    Split current list of units into equal chunks onto available threads
        Start each unit tick thread
        Start pathfinding
        Wait for unit threads to finish
        Wait for pathfinding to finish
        Commit unit updates in order
}
```

Because the pathfinding thread requires information to be read from the Units dictionary at the same time that it is potentially being written to by a unit tick thread, it would normally require both threads to attempt to obtain a lock on that unit object before interacting with it, which would introduce a high amount of additional latency that largely negates the performance benefits of multi-threading.

Instead, the pathfinding thread simply calls Prev( ) to obtain the last tick's copy of the Units dictionary. This is perfectly acceptable behavior for a wide variety of game functions, as being behind by one tick frame is rarely noticeable for the vast majority of common game features such as pathfinding or collision detection. Since no other thread is writing to the Prev( ) copy of the Units dictionary, there is no need to acquire a lock.

This system is further utilized by the rendering threads. Rendering threads are guaranteed to require read-only access to the Units dictionary. A second CircularQueue is created for their use, which behaves slightly differently: at the end of every SimTick( ), the contents of the freshly updated Units dictionary is copied into the next queue location in the rendering threads' Units CircularQueue. Their CircularQueue's queue position is then incremented. Since there is no way to ever write to a location from the simulation thread that a rendering thread may be reading from, there is no need for locking. It also allows the simulation and rendering threads to run at different latencies without any effect on overall performance, as there is no need to signal, schedule, or otherwise block each other.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Figure 8:
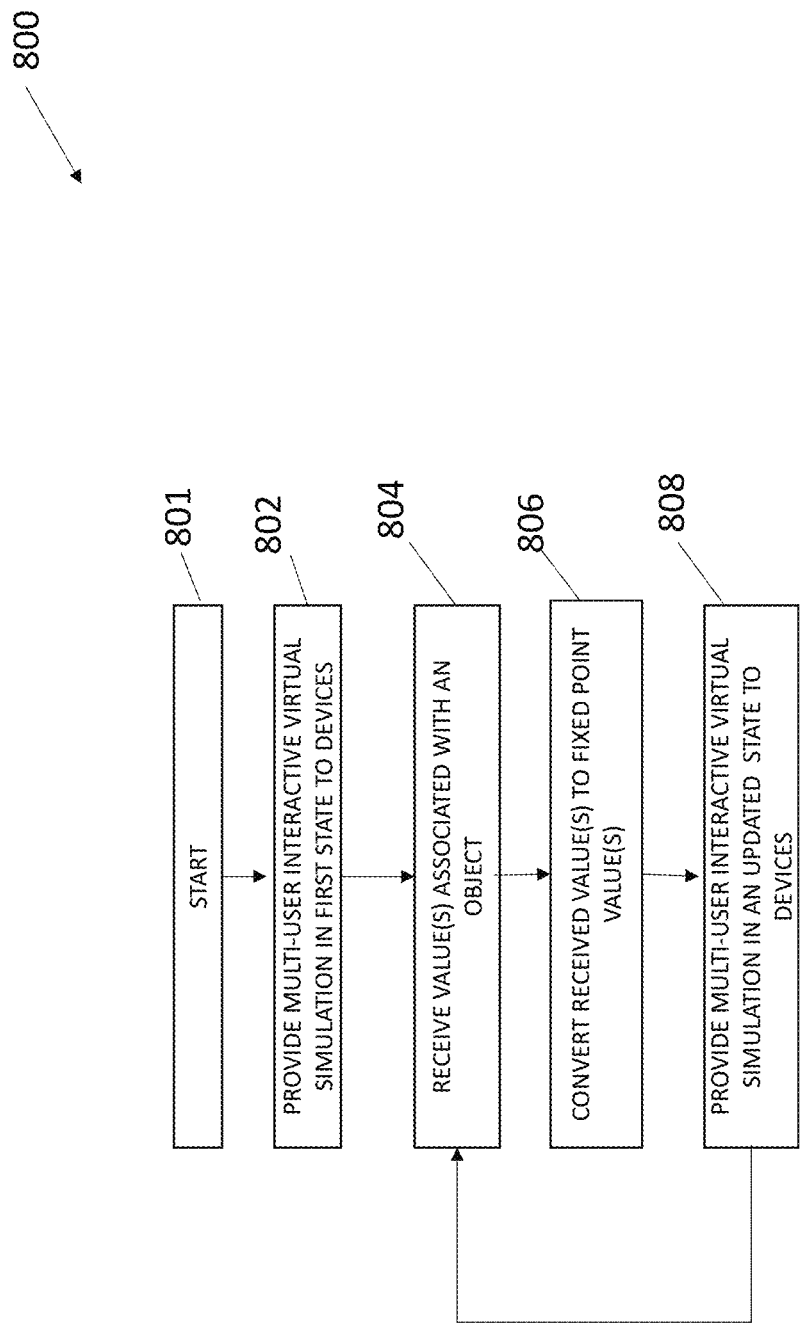
FIG. 8 is a flow diagram showing an example routine that illustrates a broad aspect of the method for providing a multi-user interactive virtual simulation for respective pluralities of devices substantially in real-time in accordance with one or more embodiments of the present application.

Turning now to FIG. 8, a flow diagram is described showing an example routine 800 that illustrates a broad aspect of the method for providing a multi-user interactive virtual simulation for respective pluralities of devices substantially in real-time in accordance with one or more embodiments of the present application. Among other objectives, the routine 800 provides the multi-user interactive virtual simulation to the plurality of computing devices in a plurality of states identically and substantially simultaneously.

It is to be appreciated that several of the logical operations described herein are implemented as a sequence of computer-implemented acts or program modules running on one or more computing devices that are operatively connected (e.g., mobile computing device, server computing device) and/or as interconnected machine logic circuits or circuit modules within the system. Accordingly, the logical operations described herein are referred to variously as operations, steps, structural devices, acts and modules can be implemented in software, in firmware, in special purpose digital logic, and any combination thereof. It should also be appreciated that more or fewer operations can be performed than those shown in the figures and described herein. These operations can also be performed in a different order than those described herein.

Continuing with reference to FIG. 8, the process begins at step 801 and a multi-user interactive virtual simulation is provided to a plurality of computing devices in a first state (step 802). Thereafter, value(s) are received from one or more of the computing devices that are associated with an object (step 804). The object is, for example, within, part of, or otherwise associated with the simulation. The received value(s) can be a floating point value(s), such as generated by one of the computing devices in a respective native client application and/or operating system. The received value(s) are converted to fixed point value(s) (step 806). Thereafter, the multi-user interactive virtual simulation is provided in an updated (e.g., 2nd) state to the devices (step 808). Thereafter, the process loops back to step 804 and, as additional values are received (step 804), they are converted to fixed point values and the simulation is provided in an updated state (step 808). This process can continue indefinitely.

In one or more implementations, the multi-user interactive virtual simulation is provided in updated states to the devices as a function of one or more commands that are transmitted to each of the plurality of devices, which execute the command(s).

In one or more implementations, each device uploads commands to a server, and the server sends each device's commands to each other device. Further, fixed point math is used in one or more implementations for simulation, path-finding, collision detection, physics, terrain generation, terrain coordinates, and scripting.

Scripting is particularly useful as it provides a self-contained technology stack. Further, scripting is not reliant upon any other 3rd party libraries or technologies, and no compilation stage toolchains in language creation are required. Further, switching supports runtime switching and merging of language syntax, and uses the Extended Backus-Naur Format to describe syntaxes. Further, scripting compiler(s) translates scripts into an abstract syntax tree, and scripts are linked to machine instructions on a custom, sandboxed virtual machine. Accordingly, scripts are fully interpreted during runtime execution, and implement a byte-code compiler and executor for optimized builds. This provides memory structure that is designed for high performance games, and host code can directly reference underlying script memory. Still further, scripts typically run on virtually any platform.

The terminology used in the above description is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof. Also, the phraseology and terminology used herein is for the purpose of description and should not be regarded as limiting.

While the present invention has been described above using specific embodiments, there are many variations and modifications that will be apparent to those having ordinary skill in the art. As such, the described embodiments are to be considered in all respects only as illustrative, and not restrictive. The scope of the invention is, therefore, indicated by the appended claims, rather than by the foregoing description.

What is claimed:

1. A computer-implemented method for providing multi-user interactive virtual simulations for respective pluralities of devices substantially in real-time, the method comprising:
providing, to a plurality of computing devices by at least one computing device, a multi-user interactive virtual simulation in a first state as a function of an input layer, a rendering layer, a simulation layer, and a scripting layer, wherein the multi-user interactive virtual simulation is provided to each of the plurality of computing devices over at least one respective network;
receiving over the at least one respective network, by at least one computing device, at least one value associated with an object associated with the simulation;
converting, by at least one computing device, the received at least one value to at least one fixed point value;
providing, to the plurality of computing devices by at least one computing device, the multi-user interactive virtual simulation in a synchronized second state as a function of the converted at least one value, wherein the multi-user interactive virtual simulation is provided to the plurality of computing devices in the second state identically and substantially simultaneously.

2. The method of claim 1, wherein the received at least one value is a floating point value.

3. The method of claim 1, wherein providing the multi-user interactive virtual simulation in the synchronized second state comprises transmitting, by at least one computing device to each of the plurality of computing devices, at least one command to be executed by each of the plurality of computing devices.

4. The method of claim 3, wherein, when the commands are executed by each of the plurality of computing devices, the multi-user interactive virtual simulation is a provided in the synchronized second state.

5. The method of claim 1, wherein the multi-user interactive virtual simulation is provided as a function of a scripting engine that comprises an integrated development environment, a memory analyzer, and an interpreter.

6. The method of claim 5, wherein the scripting engine is usable to generate at least representation of unit animations, particle effects, and sound cues.

7. The method of claim 5, wherein the scripting engine is usable to generate modifications ("mods") of the multi-user interactive virtual simulation.

8. The method of claim 1, wherein the simulation layer is implemented with multithread processing.

9. The method of claim 8, wherein the simulation layer is further implemented using a circular queuing.

10. The method of claim 1, further comprising instituting a delay before providing multi-user interactive virtual simulation to account for varying resources.

11. A computer-implemented system for providing multi-user interactive virtual simulations for respective pluralities of devices substantially in real-time, the system comprising:
non-transitory processor readable media;
at least one processor operatively coupled to the non-transitory processor readable media, wherein the non-transitory processor readable media have instructions that, when executed by the at least one processor, causes the at least one processor to perform the following steps:
provide to a plurality of computing devices a multi-user interactive virtual simulation in a first state as a function of an input layer, a rendering layer, a simulation layer, and a scripting layer, wherein the multi-user interactive virtual simulation is provided to each of the plurality of computing devices over at least one respective network;
receive over the at least one respective network at least one value associated with an object associated with the simulation;
convert the received at least one value to at least one fixed point value;
provide to the plurality of computing devices the multi-user interactive virtual simulation in a synchronized second state as a function of the converted at least one value, wherein the multi-user interactive virtual simulation is provided to the plurality of computing devices in the second state identically and substantially simultaneously.

12. The system of claim 11, wherein the received at least one value is a floating point value.

13. The system of claim 11, wherein providing the multi-user interactive virtual simulation in the synchronized second state comprises transmitting to each of the plurality of computing devices at least one command to be executed by each of the plurality of computing devices.

14. The system of claim 13, wherein, when the commands are executed by each of the plurality of computing devices, the multi-user interactive virtual simulation is a provided in the synchronized second state.

15. The system of claim 11, wherein the multi-user interactive virtual simulation is provided as a function of a scripting engine that comprises an integrated development environment, a memory analyzer, and an interpreter.

16. The system of claim 15, wherein the scripting engine is usable to generate at least representation of unit animations, particle effects, and sound cues.

17. The system of claim 15, wherein the scripting engine is usable to generate modifications ("mods") of the multi-user interactive virtual simulation.

18. The system of claim 11, wherein the simulation layer is implemented with multithread processing.

19. The system of claim 18, wherein the simulation layer is further implemented using a circular queuing.

20. The system of claim 11, wherein the non-transitory processor readable media have instructions that, when executed by the at least one processor, causes the at least one processor to institute a delay before providing the multi-user interactive virtual simulation to account for varying resources.

\* \* \* \* \*